United States Patent
Suh et al.

(10) Patent No.: US 10,306,432 B2
(45) Date of Patent: May 28, 2019

(54) METHOD FOR SETTING TERMINAL IN MOBILE COMMUNICATION SYSTEM

(75) Inventors: Kyung Joo Suh, Seoul (KR); Young Kyo Baek, Seoul (KR); Sang Soo Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 125 days.

(21) Appl. No.: 14/131,371

(22) PCT Filed: Jul. 9, 2012

(86) PCT No.: PCT/KR2012/005431
§ 371 (c)(1),
(2), (4) Date: Jan. 7, 2014

(87) PCT Pub. No.: WO2013/009059
PCT Pub. Date: Jan. 17, 2013

(65) Prior Publication Data
US 2014/0141763 A1  May 22, 2014

(30) Foreign Application Priority Data
Jul. 8, 2011 (KR) .................. 10-2011-0067828

(51) Int. Cl.
*H04W 12/06* (2009.01)
*H04W 4/50* (2018.01)
(Continued)

(52) U.S. Cl.
CPC .......... *H04W 4/50* (2018.02); *H04L 41/0806* (2013.01); *H04W 8/265* (2013.01); *H04W 12/08* (2013.01); *H04W 8/20* (2013.01)

(58) Field of Classification Search
CPC ....... G06F 21/31; H04L 63/068; H04W 12/06
(Continued)

(56) References Cited

U.S. PATENT DOCUMENTS 6,466,788 B1 * 10/2002 Carlsson ............... H04W 8/08
455/435.2
2005/0227669 A1    10/2005 Haparnas
(Continued)

FOREIGN PATENT DOCUMENTS

JP    2008219797 A  *  9/2008
JP    2011-066803 A     3/2011
(Continued)

OTHER PUBLICATIONS

3rd Generation Partnership Project; Technical Specification Group Services and System Aspects; Feasibility study on the security aspects of remote provisioning and change of subscription for Machine to Machine (M2M) equipment (Release 9); V9.2.0; XP050441986; Jun. 22, 2010; France.
(Continued)

*Primary Examiner* — Gary Lafontant
(74) *Attorney, Agent, or Firm* — Jefferson IP Law, LLP

(57) ABSTRACT

The present invention pertains to a method and apparatus for setting a mobile communication terminal. A method for setting a mobile communication terminal according to one embodiment of the present invention may comprise the steps of: transmitting, by the mobile communication terminal, an information provision request message to an information provision entity; and receiving, by the mobile communication terminal, information for access to the mobile communication terminal, which is generated by the information provision entity, from the information provision entity. According to one embodiment of the present invention, a user can directly set a service provider during initial use of a terminal or efficiently change the service provider.

15 Claims, 21 Drawing Sheets

(51) Int. Cl.
*H04W 12/08* (2009.01)
*H04W 8/26* (2009.01)
*H04L 12/24* (2006.01)
*H04W 8/20* (2009.01)

(58) Field of Classification Search
USPC ............... 726/3; 713/175; 455/411; 370/218
See application file for complete search history.

(56) References Cited

U.S. PATENT DOCUMENTS

| | | | |
|---|---|---|---|
| 2008/0301776 A1* | 12/2008 | Weatherford | G06F 21/31 726/3 |
| 2009/0240944 A1* | 9/2009 | Cho | H04L 63/068 713/175 |
| 2010/0009659 A1 | 1/2010 | Netanel et al. | |
| 2011/0136471 A1* | 6/2011 | Chen | H04W 12/06 455/411 |
| 2011/0296181 A1 | 12/2011 | Barriga et al. | |
| 2012/0252445 A1 | 10/2012 | Lindholm et al. | |

FOREIGN PATENT DOCUMENTS

| | | |
|---|---|---|
| KR | 10-2008-0088739 A | 10/2008 |
| KR | 10-2009-0078277 A | 7/2009 |
| KR | 10-2011-0020870 A | 3/2011 |
| WO | 2010/090569 A1 | 8/2010 |
| WO | 2011/057668 A1 | 5/2011 |

OTHER PUBLICATIONS

European Office Action dated Feb. 6, 2019, issued in European Application No. 12812078.9.

\* cited by examiner

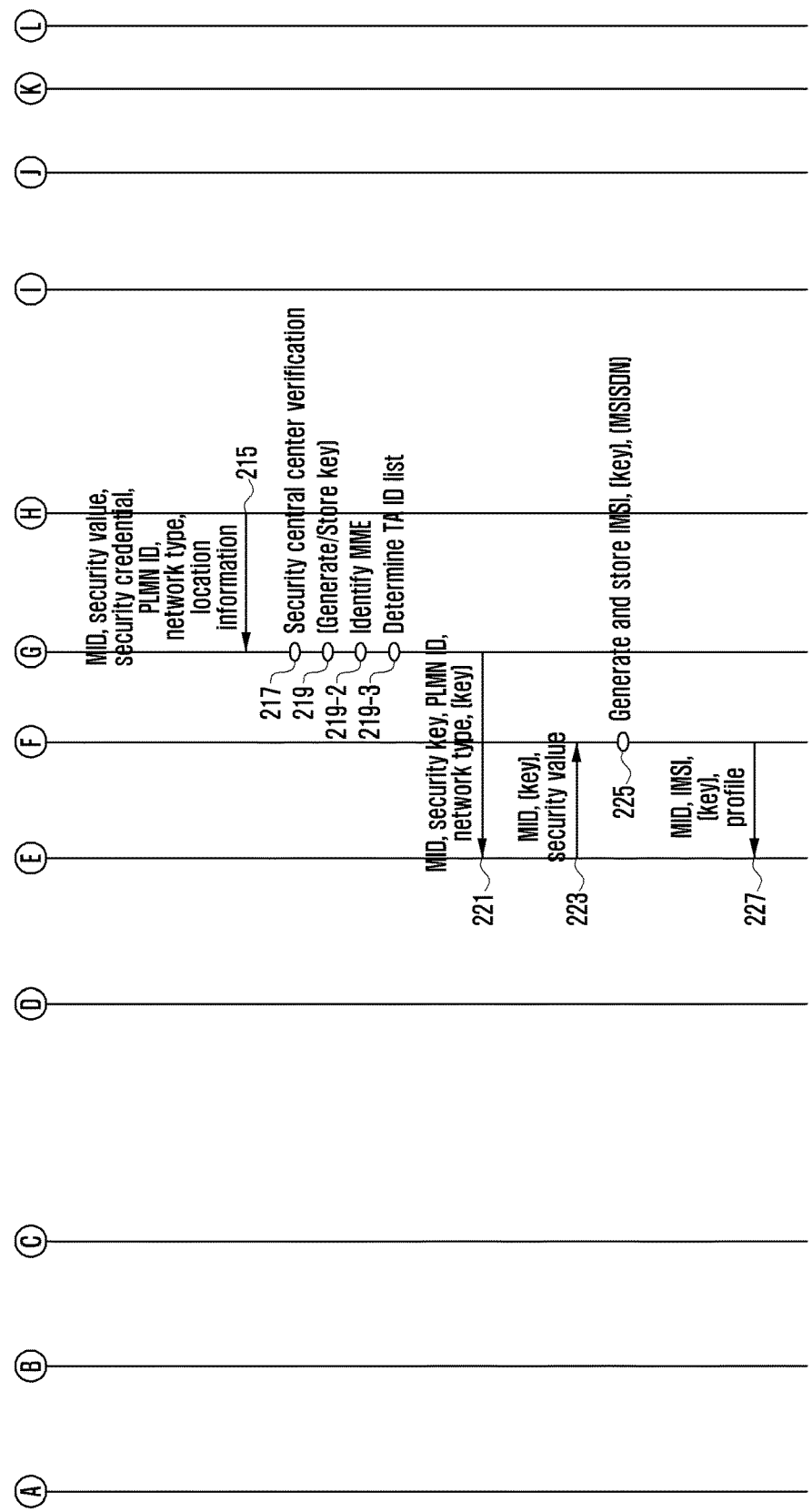

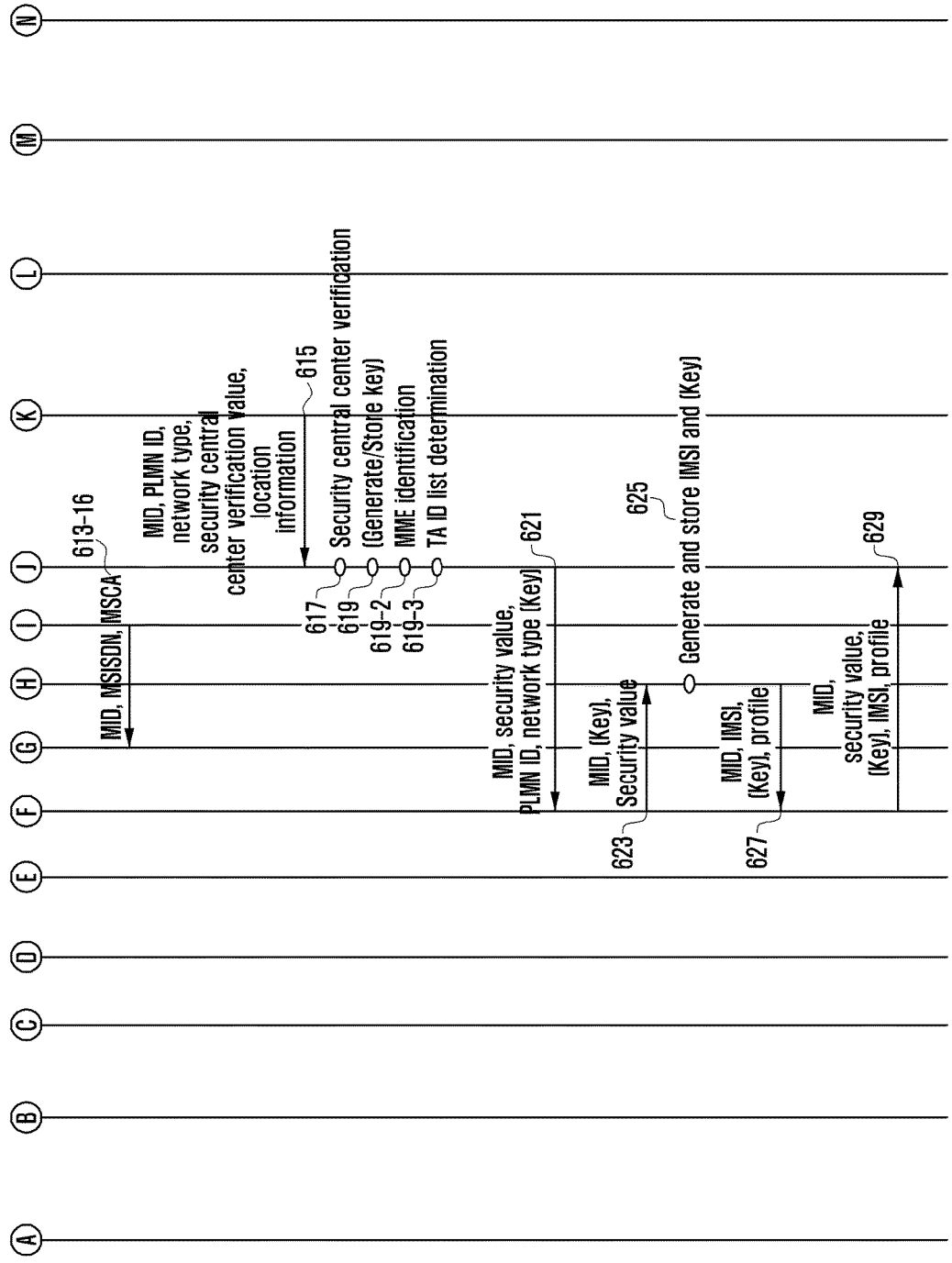

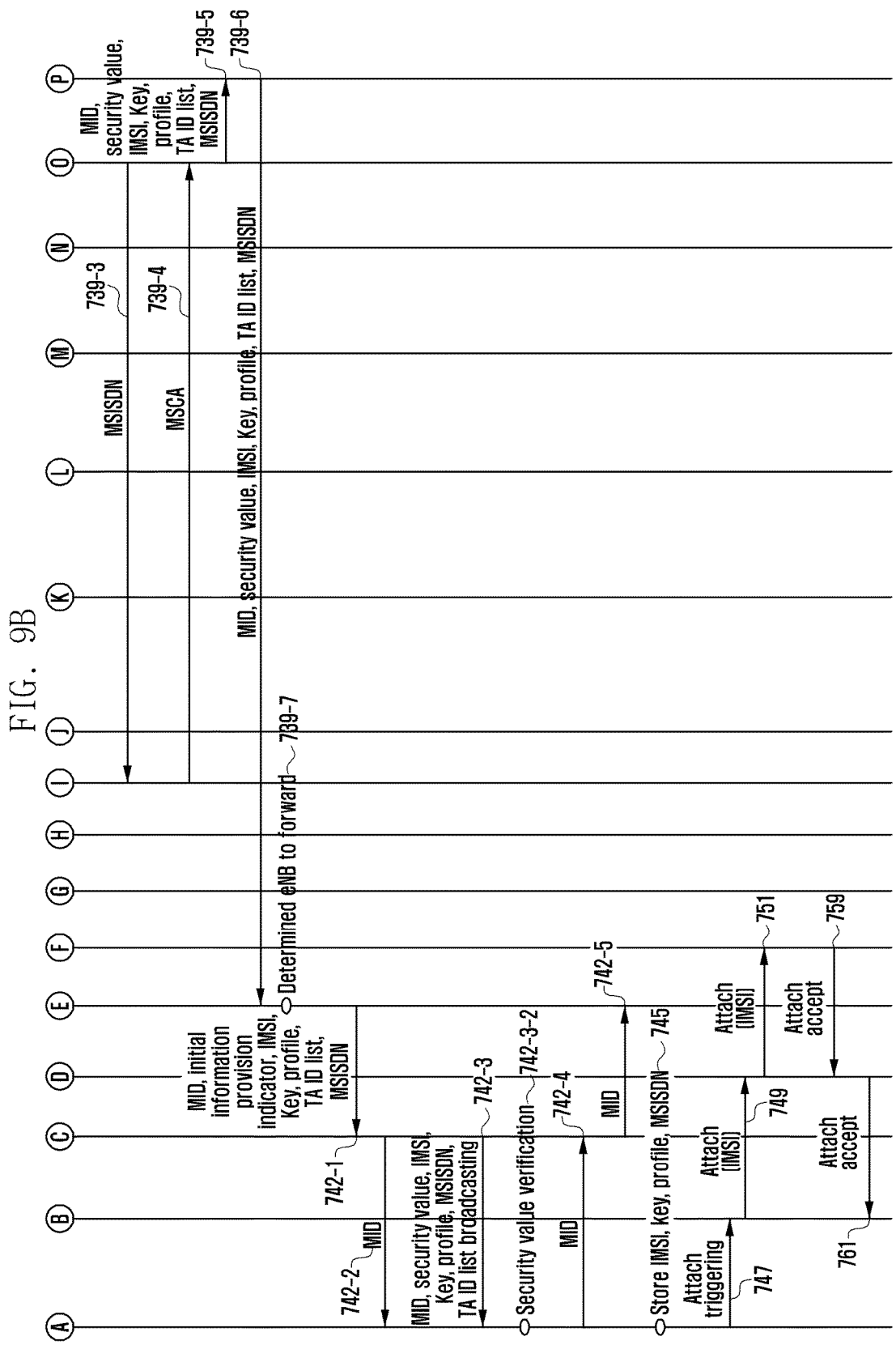

METHOD FOR SETTING TERMINAL IN MOBILE COMMUNICATION SYSTEM

TECHNICAL FIELD

The present invention relates to a method and apparatus for configuring a terminal in a mobile communication system. In more particular, the present invention relates to a method and apparatus for configuring a terminal by transmitting the information for use in network access of the terminal efficiently.

BACKGROUND ART

The 3$^{rd}$ Generation Partnership Project (3GPP) is one of the representative mobile communication technology standardization organizations. The 3GPP has defined Evolved Packet System (EPS) for next generation communication. The 3GPP also has introduced Mobility Management entity (MME) as a network mobility entity.

Recently, the protocols used in the 3G system of the 3GPP have been improved by the researchers in the field. The researchers have proposed improvement schemes for providing high speed communication service in the next generation mobile communication system. In the conventional communication method, the authentication and security procedures have been performed on the radio access layer. The researchers are focusing on the reinforced security management scheme with the introduction of security protocol concept on the NAS layer in addition to such convention procedures.

In the conventional system architecture, however, the terminal has to select one operator as the service provider. The terminal stores the security and other informations associated with the corresponding operator to connect to the operator. In any case, the corresponding terminal may attempt to receive the service from another operator. For this purpose, the corresponding terminal has to use Universal Subscriber Identity Module (USIM) or Universal Integrated Circuit Card (UICC) corresponding to the operator. That is, since the subscriber identity module is operator-specific, it is not easy for the user to switch between operators.

There is therefore a need of a method and apparatus for storing information for use in access to the operation in the subscriber identity module. In this way, the user is capable of configuring the operator at the initial use of the terminal and switching between operators efficiently.

DISCLOSURE OF INVENTION

Technical Problem

The present invention has been conceived to solve the above problem and aims to provide a device information transmission method and apparatus that is capable of configuring an operator at the initial use of the terminal and switching between operators efficiently.

Solution to Problem

In accordance with an aspect of the present invention, a method for configuring a mobile communication terminal includes transmitting, at the mobile communication terminal, an information provision request message to an information provision entity and receiving, at the mobile communication terminal, information for use in connection of the mobile communication terminal from the information provision entity.

In accordance with another aspect of the present invention, a method for configuring a mobile communication terminal includes receiving, at an information provision entity, an information request message from the mobile communication terminal, generating, at the information provision entity, information for use in connection of the mobile communication terminal, and transmitting, at the information provision entity, the information for use in connection of the mobile communication terminal.

Advantageous Effects of Invention

The method and apparatus according to an embodiment of the present invention is advantageous in that the user is capable of configuring an operation at the initial use of the terminal and switching between operators efficiently.

MODE FOR THE INVENTION

Figure 1:
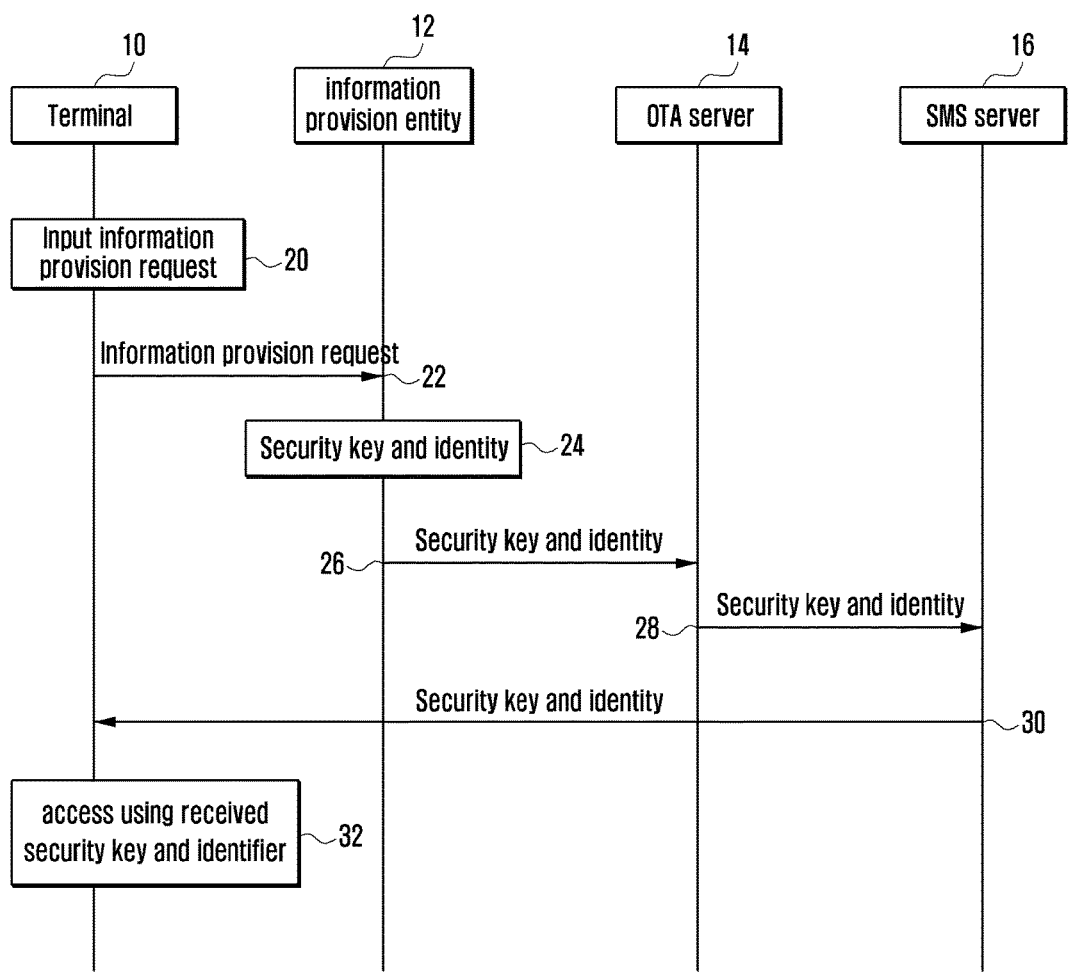
FIG. 1 is a flow diagram illustrating an information provision procedure according to an embodiment of the present invention.

Exemplary embodiments of the present invention are described with reference to the accompanying drawings in detail.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The device information transmission method and apparatus according to the embodiments of the present invention are described hereinafter with reference to the accompanying drawings.

In the following description, the terminal performs communication using a NAS protocol between the terminal and MME and other protocols in a mobile communication system. In this case, the present invention may include provisioning initial information for the terminal to perform communication in the corresponding operator network, providing the terminal with terminal information, and managing the provided identifier. Here, the terminal information includes a security key, parameter, and identifier for use in communication. Hereinafter, the present invention is described with the examples of EPS system, UTRAN, and GERAN based on 3GPP. However, the present invention is applicable to other mobile communication systems. The present invention can be applied to the procedure of initial provisioning of the initial information for use in access to a certain operator's system or the procedure of storing, when the terminal switches the operator, the information related thereto for access to the switched operator. It is obvious that various modifications can be made to the embodiments without departing from scope of the present invention.

Figure 2:
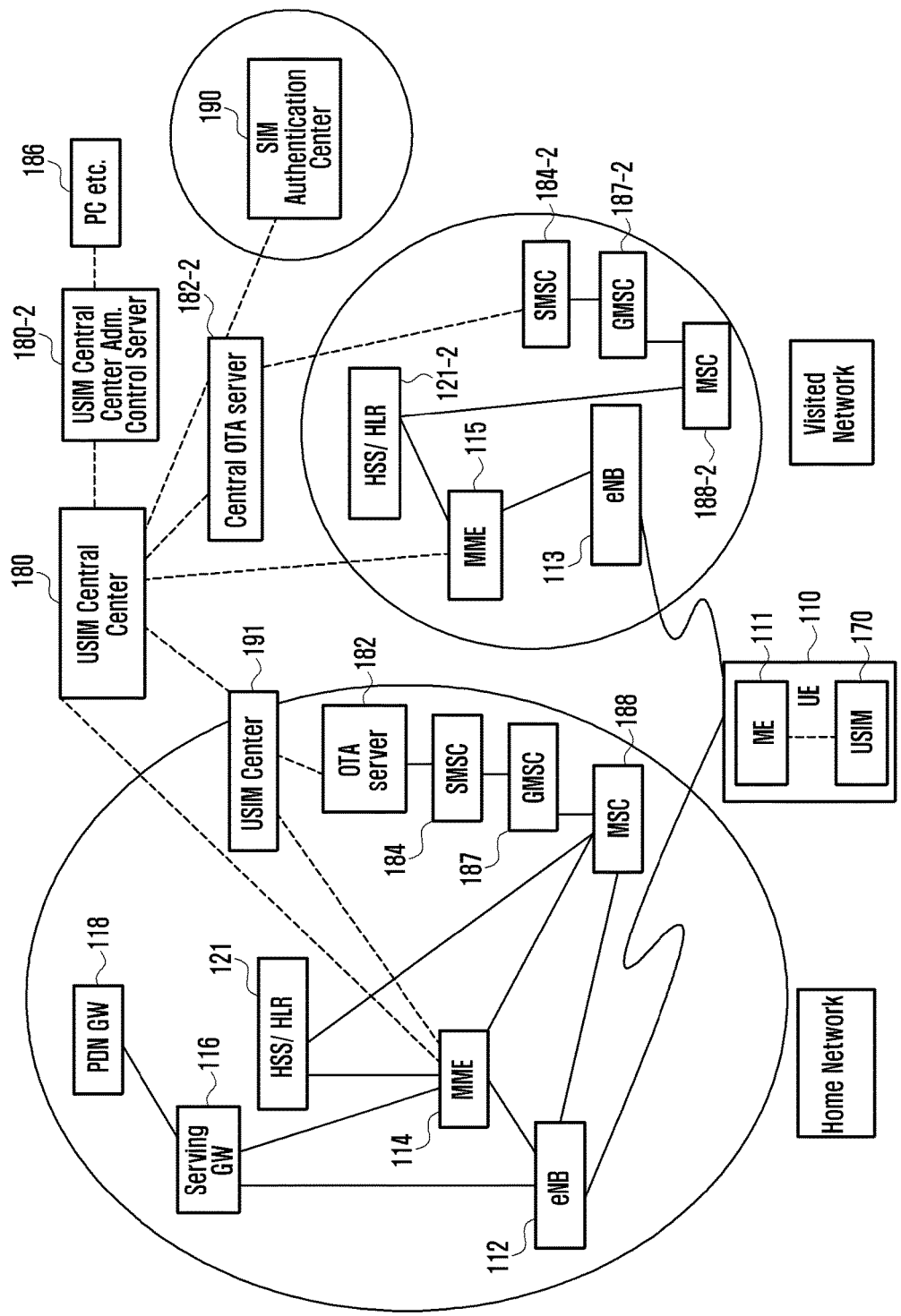
FIG. 2 is a diagram illustrating network architecture according to an embodiment of the present invention.
Figure 3:
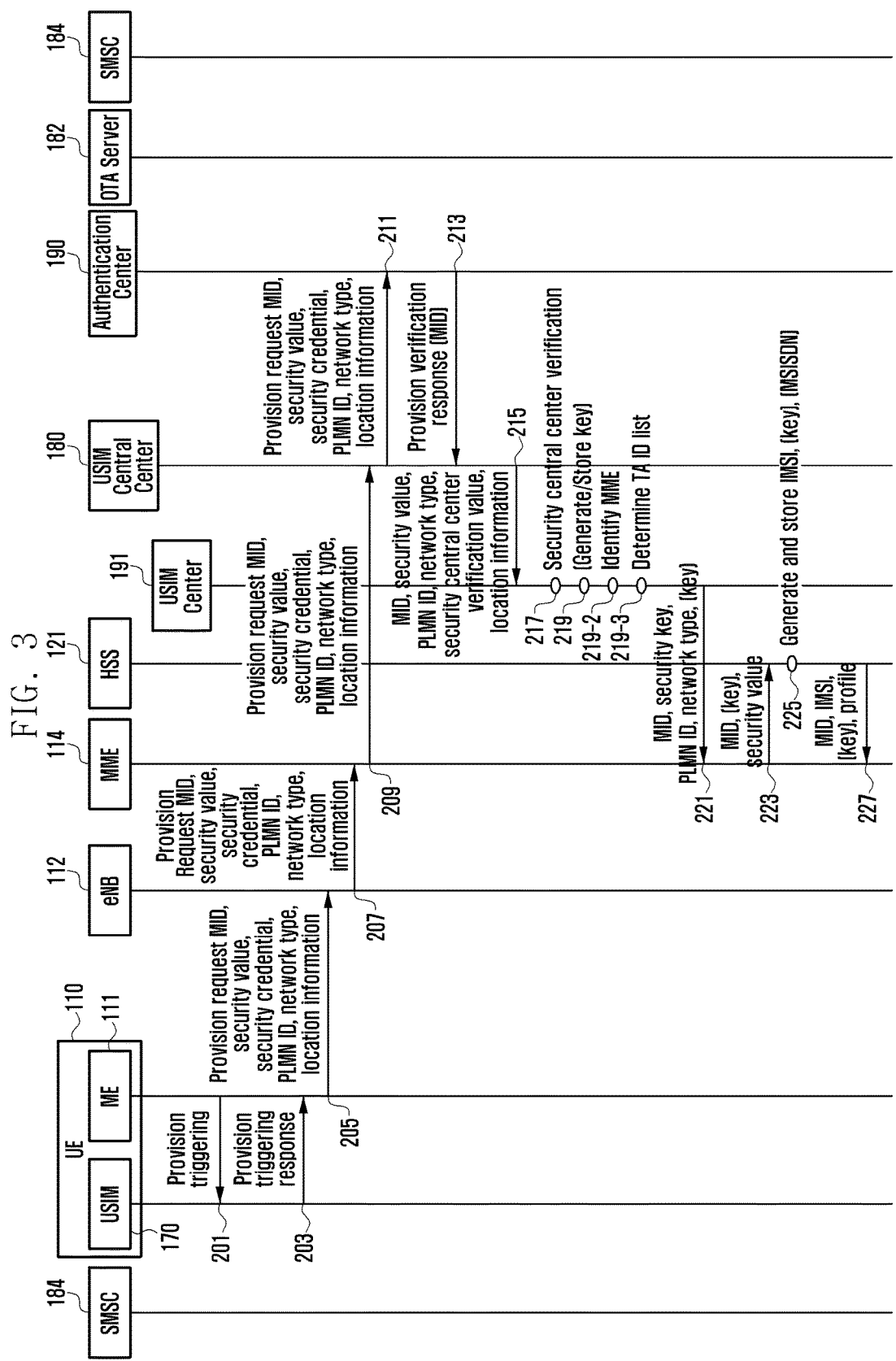
FIGS. 3 to 12*b* are flow diagrams illustrating information provisioning procedures according to embodiments of the present invention.

As shown in FIG. 2, the embodiment of FIG. 2 is a one of the objects of the p resent invention. In order to accomplish the object, the mobile communication system provides the terminal with security parameter and identifier under the EUTRAN environment. In the case that the terminal performs authentication and when the terminal communicates with a network entity such as MME, the security may be supported. Such a method is applicable to other communication systems having the similar technical background and channel format and network architecture. Such a method is applicable to other mobile communication system operating with similar protocols or different in protocol but operating similarly without departing from the scope of the present invention. This is obvious to those skilled in the art.

An embodiment of the present invention can be applied to the case of supporting the NAS protocol and other security protocols in the evolved mobile communication system such as 3GPP EPS. In the procedure that the terminal communicates with the network, the terminal configures subscriber information appropriate for specific operator and related security key. Afterward, the terminal is capable of performing secure communication with the network efficiently using the security key. According to an embodiment of the present invention, the terminal is capable of selecting an operator provisioning the security key or the information necessary at least for use in setting the communication. According to an embodiment of the present invention, the terminal may configure the information necessary for use in communication. The mobile communication may support authentication. The mobile communication system also may manage the security between the terminal and an entity such as MME and maintain communication therebetween. The present invention is applicable to the radio access technologies prior to 3GPP such as UTRAN, GERAN, and other radio access network as well as 3GPP EPS and UTRAN.

There is a problem in configuring the subscriber information and security parameters in a mobile communication network. According to the present invention, such a problem can be solved and managed using Non-Access Stratum (NAS) protocol and protocols between other network entities.

According to an embodiment of the present invention, the terminal may set the parameters for selecting an operator and select the security information. That is, the terminal may set the subscriber information and perform security procedure dynamically. Through this, the terminal can perform communication in the security environment. An embodiment of the present invention can be applied to Evolved Universal Terrestrial Radio Access Network (EUTRAN) and Universal Terrestrial Radio Access Network (UTRAN)/GSM/EDGE Radio Access Network (GERAN).

FIG. 1 is a flow diagram illustrating an information provision procedure according to an embodiment of the present invention.

Referring to FIG. 1, the terminal 10 receives an information provision request input by the user at step 20. The information provision request input is the input commending to request the mobile communication network to provide mobile communication network access key and other UE terminal information such as identifier. Such an input is described with the embodiments of FIGS. 3 to 12b.

The terminal 10 transmits the information provision request at step 22. The information provision request procedure is the procedure in which the terminal requests for the security key and identifier for use in the communication network. The information provision request message includes the Mobile Identity (MID) for used in requesting for the information and security information for use in checking whether the terminal can request for the information. The information provision request may include other informations that are to be described with the embodiments of FIGS. 3 to 12b.

The information provision entity 12 provides the security key for the terminal 10 and other information necessary for use in network connection such as terminal identifier at step 24. The security key is the master key for use in generating the key necessary for the terminal 10 to connect to the mobile communication system. Various keys for use in communication are generated based on the master and distributed. The security key according to an embodiment may be generated by any of various entities. A description is made of the procedure of generating and distributing the security key and identifier in detail with reference to the embodiments of FIGS. 3 to 12b.

The information provision entity sends the terminal 10 the identifier or other information necessary for used in access such as security key via the operator network or unlicensed band communication network such as the OTA server 14 and SMS server 16 at steps 26, 28, and 30. According to an alternative embodiment, the identifier or key and other information necessary for use in access to the communication network may be transferred via other entities than the OTA server 14 and SMS server 16.

The terminal 10 may connects to the mobile communication system using the received identifier and/or security key at step 32.

Although the embodiment of FIG. 1 is directed to the case where the terminal 10 transmits the information provision request directly, it is also possible to transmit the information provision request via an information processing device such as PC. This is described later with reference to FIGS. 10a to 12b.

FIG. 2 is a diagram illustrating network architecture according to an embodiment of the present invention. Shown is the 3GPP EPS system architecture. Although this embodiment is directed to the E-UTRAN, the present invention may be applied to other mobile communication system.

Referring to FIG. 2, the evolved Node Base station (eNB)/Radio network Controller (RNC) 112 establishes a radio connection for communication with the User Equipment (hereinafter, referred to as terminal or UE) 110 located within the service area of the eNB. The service area of each eNB/RNC is referred to as cell.

The UE 110 denotes the terminal connecting to a packet data network such as Internet via a Serving Gateway (hereinafter, referred to as Serving GW or SGW) 116. The UE 110 consists of two elements. That is, the UE 110 consists of a Mobile Equipment (ME) 111 and a USIM 170. The ME 111 is the component responsible for communication function in interoperation with the user or network. The USIM 170 is the component responsible for storing and managing subscriber information and security information.

According to an embodiment, the mobile communication system includes a Packet Data Network Gateway (PDN GW) 118. The PDN GW 118 is key network entity of the packet data network and works as Home Agent (HA).

The mobile communication system further includes Mobility Management Entity (MME)/Serving GPRS Support Node (SGSN) 114 115. The MME/SGSN 114 and 115 is responsible for UE mobility management, UE location management, and registration management.

The mobile communication system further included Home Subscriber Server (HSS)/Home Location Register (HLR)/Authentication Center (AUC) 121. The HSS/HLR 121 manages user and UE authentication information and service information. The HSS/HLR/AUC 121 connects to the MME/SGSN 114 through an interface. There is an interface for providing data path and managing UE mobility between the eNB/RNC 112 and the serving GW 116 and between the MME/SGSN 114 and the Serving GW 116.

In this embodiment, the UE 110 and the MME/SGSN 114 communicate through NAS protocol stack for mobility management and session management. Each of the home network and visited network may be one of various RAT types such as EUTRAN, UTRAN, and GERAN and unlicensed band WLAN (Wi-Fi).

According to this embodiment, the mobile communication system includes a USIM center 191. The USIM center participates in the procedure of storing the operator or user information in the UICC and transferring operator-specific security parameter of the UE 110, security key, and UE identifier to the user.

According to this embodiment, the mobile communication system includes a USIM Central Center 180. The user may transfer the user information storage request to the USIM Central Center through Internet using the UE 110 or other information device 186 such as PC. The USIM Central Center 180 receives the user information provision request.

The mobile communication system includes a USIM authentication center 190. The USIM authentication center 190 participates in the procedure of authenticating USIM security information.

According to this embodiment, the Over The Air (OTA) technology is used for secure transmission and management of the subscriber authentication information, security parameters, and identifiers. For this purpose, the mobile communication system includes OTA servers 182 and 182-2. The mobile communication system includes Short Message Service Center (SMSC) 184 and 184-2. The SMSC 184 and 184-2 performs related message transmission.

The mobile communication system includes SMS Gateway MSC (GMSC) 187 and 187-2 for message transmission and Mobile Switching Center (MSC) 188 and 188-2.

In FIG. 2, the network entities of the home and visited network are denoted by different reference numbers. Also, the OTA server 182 included in the home network and the central OTA server 182-2 included in a specific operator network are denoted by different reference numbers.

The operation procedures according to the embodiments of the present invention are described hereinafter with reference to FIGS. 3 to 12b. The following descriptions on the embodiments are made with reference to FIG. 2. In the following embodiments, the operations of the UE 110, MME 114, HSS 121 and 121-2, and other network entities are described. According to such operations, the operator network-specific security information and identifiers of the user are transmitted efficiently.

FIGS. 3 to 5b are flow diagrams illustrating initial provisioning or information provisioning procedure according to an embodiment of the present invention.

The information provision is triggered at step 201. The user may manipulate the interface of the UE 110 to select an operator. The user may select an operator first after purchasing the UE or USIM or switch to an operator through a process of the present invention. The user may enter a network of the corresponding operator to receive a certain service. That is, the user may select whether to use the 3G network or E-UTRAN. The UE 110 initiates the information provision procedure to receive the service from the corresponding operator. This procedure may be performed in such a way that the user selects the user interface of the UE 110. The user may make a selection input to the UE 110, particularly ME 111.

The USIM 170 sends the ME 111 a provision triggering response at step 203. The provision triggering response is transmitted in reply to the information provision triggering at step 201.

Such information provision initiation process includes transmitting the information provision triggering from the ME 111 to the USIM 170 at step 201 and transmitting the information provision triggering response from the USIM 170 to the ME 111 at step 203. Particularly, step 203 comprises a step of reading information from the USIM 170 to acquire the information which the UE 110 is to transmit through the network. Step 203 also includes preparing for transmitting the information to the network.

The information provision request message is transmitted from the UE 110 to the MME 114 via the eNB 112 at steps 205 and 207. The information provision request message is delivered to the USIM Central center 180 via the MME 114. In order for the UE 110 to receive through the network of the corresponding operator, the security information or other information such as identifier is required. At steps 205 and 207, the UE 110 has no information necessary for receiving the service form the corresponding operator. Accordingly, if the UE 110 is requesting the initial information, this is the situation capable of accessing to the USIM Central Center 180 in a limited mode. If the user 110 is in changing the operator, it may be in the normal communication mode.

The information provision request message may include Mobile Identity (MID). Depending on embodiment, the information provision request message may include at least one of Security Value, Security Credential, Public Land Mobile Network Identity (PLMN ID), network type, and UE location (loc.).

The MID is the identifier for the USIM Central Center 180 to identify the UE 110 or USMI/SIM/UICC 170. The MID is assigned by the UE 110 or a manufacturer (vender) of the USIM/SIM/UICC 170 and used for the USIM Central Center 180 to identify the corresponding UE 110. The MID may be expressed in different type of identifier format that can be transmitted through paging or over a radio channel. The USIM/ISM/UICC is provided in the form of a module or card containing the subscriber authentication information capable of identifying the subscriber.

The information provision request message may include the security information along with the MID information. The security value and credential are representative security information.

The security value is used when a message is received in response to the information provision request message. The UE 110 compares the security value it has transmitted and the received message. Through the comparison, it is possible to test whether the received message is the malicious message sent by an attacker or an invalid node. That is, the security value is sued to verify the message transmitted in response to the request in has transmitted. Various values capable of authenticating the UE such as security algorithm value supported by the UE like security capability or random number generated by the UE 110 can be used as the security value.

Typically, the security credential is composed of a pair of public key and secret key and a certificate in the public key infrastructure (PKI) security method. In the present invention, however, the security credential is a general expression on the information capable of being used for verification of the valid terminal used in the USIM authentication center 190 as well as such information.

If the PKI method is used, the USIM authentication center 190 may use the security credential to authenticate the UE 110 or USIM 170 which has transmitted the authentication value as a method used in general. It may be used to authenticate peer nodes transmitted the value though the Authentication and Key Agreement protocol (AKA) mutually. In this case, the vector value used in AKA may be the security credential. In the case of using the authentication method with random number and key value, the random value may be sued as the security credential. Other various candidate technologies may be used. In the following embodiment, if there is any security information which the USIM authentication center 190 can use to verify the valid user, this can be referred to as security credential.

The PLMN ID is also referred to as serving network ID. In order for the subscriber to provide the country information of the operator network for subscription and operator network information to the USIM center 191, the UE 110 may send the information on the network providing the service using the PLMN ID. The network type is the information on the type of the network providing the service. The network type may be the information on the type of the network of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). If the network type is included in the information provision request message, the UE 110 may use one of various network types provided by the corresponding operator selectively. That is, the UE 110 may select the wired/wireless link for use in receiving the service. The location information of the UE 110 can be used to determine the MME 114 or MSC 188 providing the user with the service or determining the tracking area providing the user with the service.

The MME 114 sends the USIM Central Center 180 an information Provision Verification Request message at step 209. Upon receipt of the information Provision request message from the UE 110, the MME 114 sends the USIM Central Center 180 the information Provision Verification Request message. The information Provision verification request message may include the Mobile Identity (MID). According to an embodiment, the information provision verification request message may include at least one of security value, security credential, PLMN ID, network type, and UE location information (loc.).

The above embodiment has exemplified the case where the UE 110 determines the type of the serving network at the time of selecting the operator and transmitting the information provision request message. However, if the connected operator is the operator to which the UE 110 intends to subscribe, an alternative embodiment may be applied. According to an alternative embodiment, the MME 1140 provides the network type information on the network to which the MME belongs at the time when it sends the USIM Central Center 180 the information provision verification request message at step 209 since the UE 110 has transmitted the information provision request message. The network type may be any of the operator's wired/wireless networks including Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). According to the alternative embodiment, the MME 114 sends the USIM Central Center 180 the network type along with the MID, security value, security credential, and PLMN ID transmitted by the UE 110.

Afterward, the USIM Central Center 180 sends the USIM authentication center 190 the information provision verification request message at step 211. The information provision verification request message may include MID. According to an embodiment, the information provision verification request message may include at least one of security credential, PLMN ID, and network type. The USIM Central Center 180 requests for verifying that the MID identifies the valid user accessible to the operator using the information provision verification request message. In the information provision request verification, various security credentials can be used.

If the USIM authentication center 190 and the UE 110 use the PKI system, the public key and security key of PKI are used as security credentials. That is, the USIM Authentication Center 190 verifies the UE 110 or USIM 170 which has transmitted the authentication value with the public and security keys. It may be used to authenticate peer nodes transmitted the value though the Authentication and Key Agreement protocol (AKA) mutually. In this case, the vector value used in AKA may be the security credential. In the case of using the authentication method with random number and key value, the random value may be used as the security credential. Other various candidate technologies may be used. In this embodiment, if there is any security information which the USIM authentication center 190 can use to verify the valid user, this can be referred to as security credential. A detailed procedure of using the security credential is not mentioned. However, the USIM Central Center 180 sends the USIM Authentication Center 190 the information provision verification request message and receives the information provision verification response message in replay at steps 211 and 213 as the corresponding procedure. In this case, the security parameter called security credential used at steps 211 and 213 may be determined depending on whether to use PKI or AKA scheme. In any case, however, it is possible to verify the valid access of the UE 110 based on the information provided by the UE 110 such as security parameter and identity called as security credential at steps 211 and 213. This verification procedure can be modified in various ways by those skilled in the art. The USIM Authentication center 190 sends the USIM Central Center the information provision authentication response message at step 213. The information provision authentication response message may include MID to indicate corresponding information provision authentication request verified successfully.

In the following, the process of steps 213-2 to 213-16 or the process of steps 227-2 to 227-7 are performed selectively.

Figure 4A:
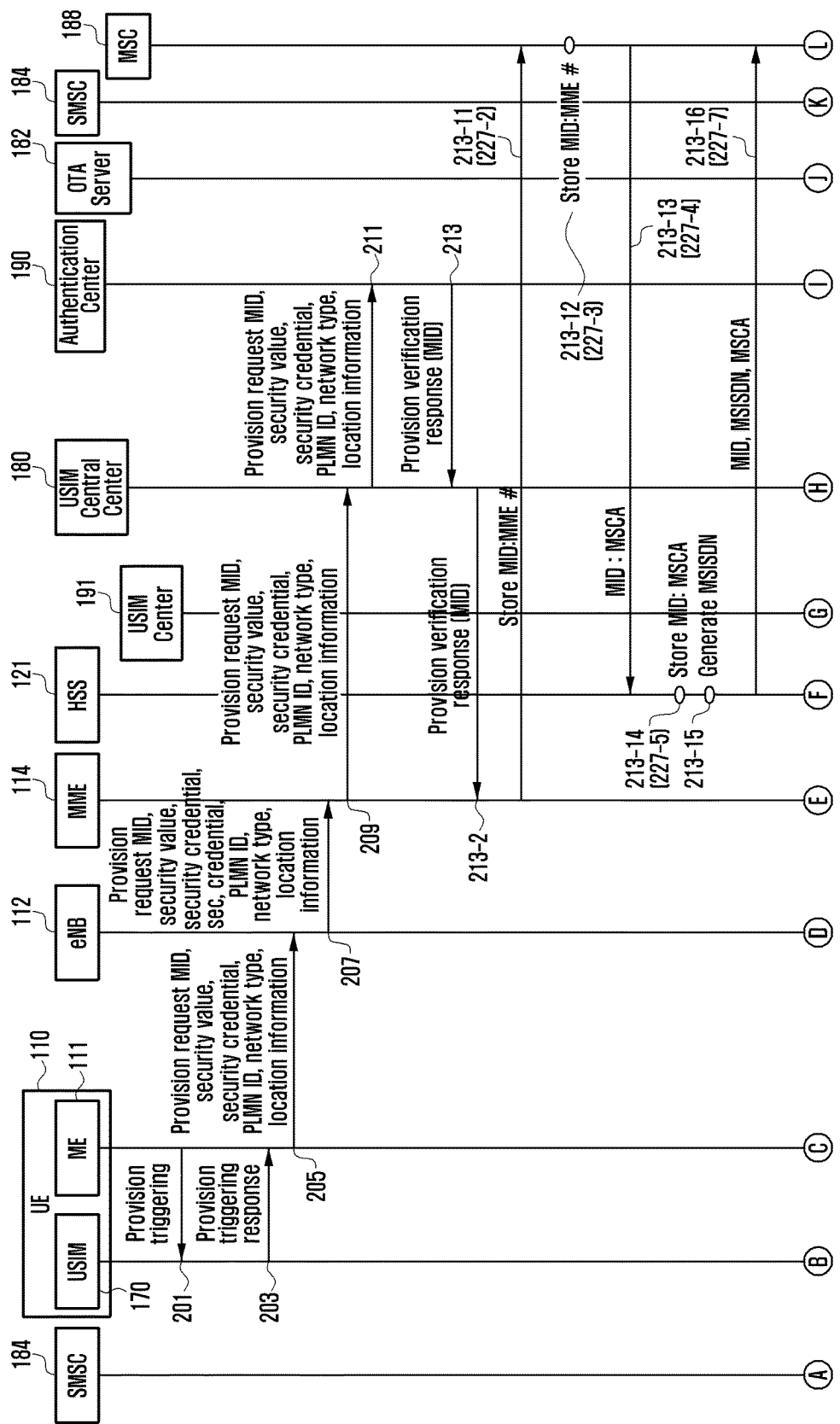
Figure 5A:
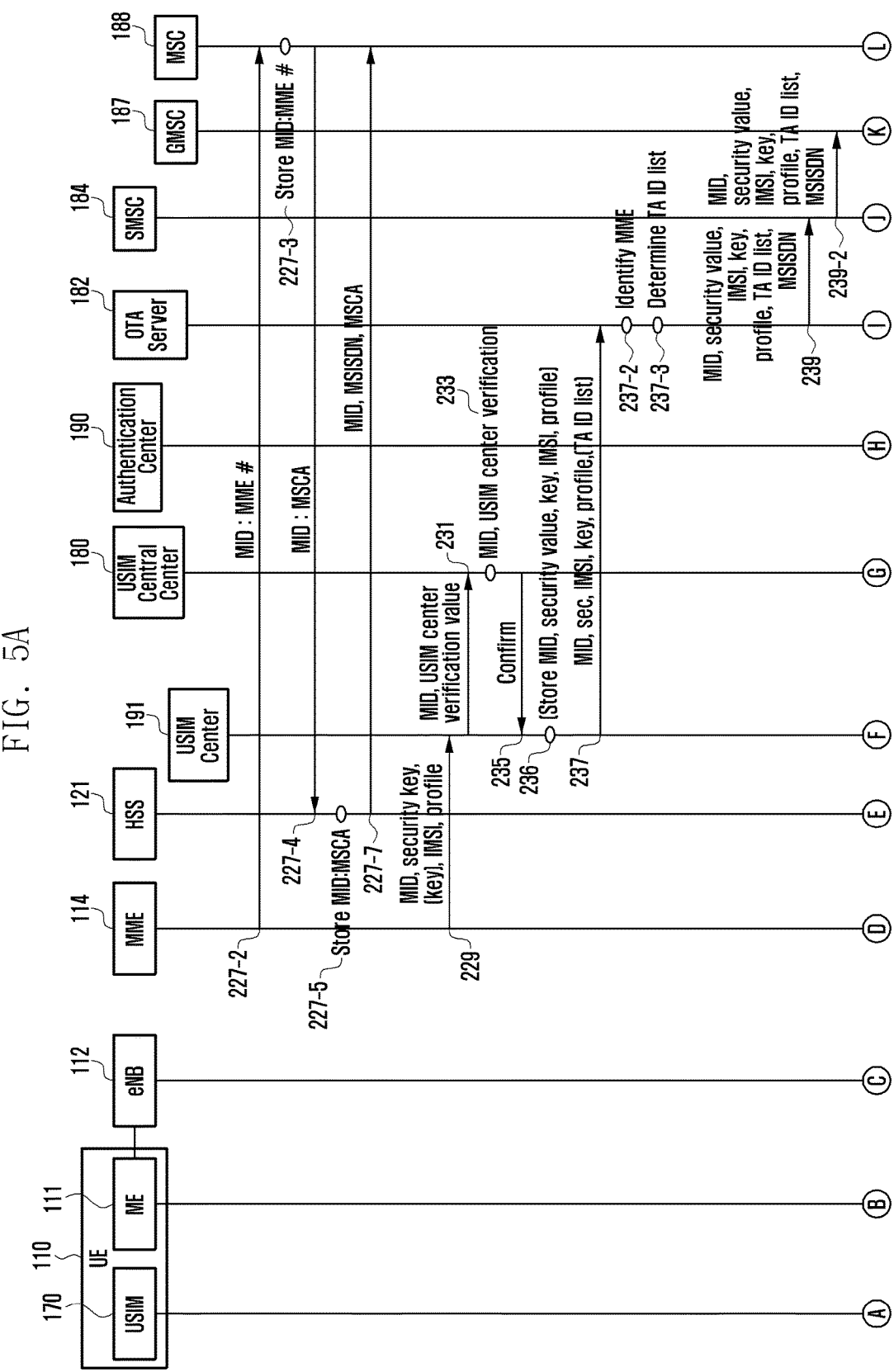
Figure 5B:
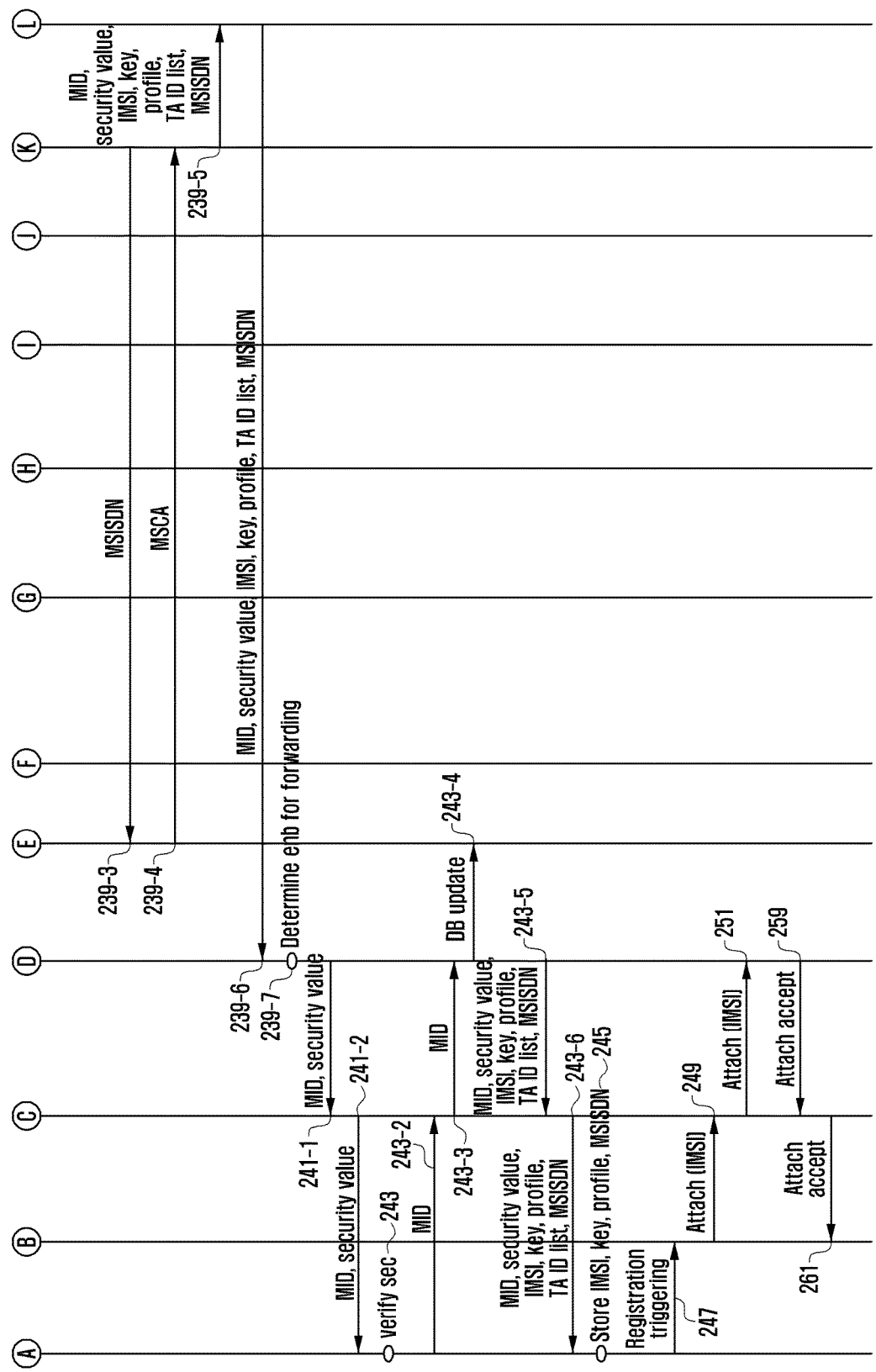

A description is made of the embodiment of executing steps 213-2 to 213-16 with reference to FIGS. 4a and 4b.

As described above, the USIM Central Center 180 receives a response message from the USIM authentication center 190 in reply to the information provision verification request at step 213. Then the USIM Central Center 180 sends the MME 114 the information provision response message at step 213-2. The information provision response message may include MID.

After the verification process, the MME 114 sends the MSC 188 a location registration request message at step 213-11. The location registration request message may include MID and/or MME identifier. Afterward, the MSC 188 stores a mapping between the MID and MME identifier at step 213-12. The MSC 188 sends the HSS 121 the MID at step 213-13. Depending on the embodiment, the MSC 188 may further send the address information (MSCA) of the MSC. The HSS 121 stores the mapping between MID and MSCA at step 213-14. The HSS 121 may generate MSISDN at step 213-15. The MSISDN is used as an identifier for communication in a Circuit Switching network. The HSS 121 may send the MSC 188 the MID at step 213-16. Depending on the embodiment, the HSS 121 may further transmit at least one of MSISDN and MSCA. The above-described steps 213-11, 213-12, 213-13, 213-14, and 213-16 are identical with steps 227-2, 227-3, 227-4, 227-5, and 227-7 to be described hereinbelow. If steps 213-11, 213-12, 213-13, 213-14, and 213-16 are executed (case 1), steps 227-2, 227-3, 227-4, 227-5, and 227-7 are skipped. In contrast, if 227-2, 227-3, 227-4, 227-5, and 227-7 (case 2) are executed, steps 213-11, 213-12, 213-13, 213-14, and 213-16 are skipped.

Afterward, the USIM Central Center 180 may send the USIM center 191 the MID at step 215. Depending on the embodiment, the USIM Central Center 180 may further send the USIM center 191 at least one of security value, PLMN ID, network type, security central center (Sec-Central center) verification value, and UE location information (loc.). The Security central center verification value is used for verifying the USIM central center 180. The Sec-central center verification value may be the value including the public key/security key in the case of using the PKI system for verification. The Sec-central center verification value also may be a random number which is ciphered or deciphered using a shared key. Various values can be used as the Sec-central center verification value, and detailed description on the mutual authentication procedure is omitted herein.

Upon receipt of the parameter, the USIM center 191 verifies the Sec-central center verification value at step 217.

The USIM center 191 may generate a security key at step 219. This corresponds to an embodiment (case 1) in which the USIM center 191 generates and distributes the security key. According to another embodiment (case 2), the USIM center 191 has no security generation function. In this embodiment, the AUC/HSS/HLR 121 is responsible for the corresponding function. That is, the AUC/HSS/HLR 121 generates the security key which may be used as the master key (root key) allocated to the corresponding operator in itself. According to another embodiment (case 3), the USIM center 191 generates the security key to the operator and the operator uses this key as the seed for generating the security master key as operator-specific reinforced key. That is, the USIM center 191 generates the security key. The AUC/HSS/HLR 121 of the operator network generate another derived master key (Kdm) working as the role of the master used in the operator network using the security key as a seed. The master key may be the root key as the security key or the derived master key (Kdm). On the basis of such a master key, the operator network generates authentication key (KASME). The operator network generates a NAS integrity key (KNASint) and NAS encryption key (KNASenc).

The USIM center 191 determines the MME to which the UE has connected or the MSC connected to the MME to which the UE has connected or another MME or MSC to provide the UE with the initial information provision service at step 219-2. The USIM center 191 may use at least one of PLMN ID, UE location information, and UE-connected network information to make such a determination. In this embodiment, the MME to which the UE 110 has connected and the MSC connected to the corresponding MME provide with UE 110 with the initial information provision service. However, this method can be modified in various ways. That is, such a selection method can be modified in various ways depending on whether which operator provides the service instead to the network operator to which the UE has been connected.

The USIM center 191 may determine an identity (ID) list of tracking areas (UE location registration area) at step 219-3. The tracking area may be used by the MME to select the eNB for delivery of the initial information provision service. The TA ID list is sent in the process after step 237 or 239. The MME may be selected by the USIM center 191. In a certain case, however, the OTA server 182 may be responsible for such function as being described with reference to steps 237-2 and 237-3.

In an embodiment (case 1), if the USIM center 191 generates and stores the security key at step 219, it sends the MME 114 of the operator network to which the UE 110 intends to subscribe at least one of MID as UE or USIM/UICC/SIM identifier, security value, PLMN ID, and network type. Afterward, the MME 114 sends the HSS/HLR 121 the MID and security value at step 223. If the USIM center 191 generates the security key, the MME may send the HSS/HLR 121 the security key too. The AUC/HSS/HLR 121 generates and stores the IMSI as the identifier of the UE 110 at step 225. If the USIM center 191 has not generated the security key, the AUC/HSS/HLR 121 generates and stores the security key according to another embodiment (case 2). The AUC/HSS/HLR 121 may generate and store the Mobile Station International Integrated Services Digital Network Number (MSISDN) necessary for communication in a CS network at step 225. If the network to which the UE has connected initially is identical with the network for providing service afterward, the MSISDN may be generated at step 213-15. According to another embodiment, the MSISDN may be generated afterward at step 225. However, if the network which the UE 110 has connected initially differs from the network which is to provide the service afterward, the MSISDN generated at step 213-15 is used for providing information to the UE 110 while the MSISDN allocated at step 225 is used as the identifier for use in the network afterward. Unlike the above example (case 1), the AUC/HSS/HLR 121 generates the security in another embodiment (case 2). In still another embodiment (case 3), a master key (derived master key) is generated using the security key sent by the USIM center 191 as a seed, the derived master key (Kdm) being used as the security master key. In the case 1, the security key transmitted stored at steps 227, 229, and 236 is the security key generated by the USIM center 191. In the case 2, the security key transmitted and stored at steps 227, 229, and 236 is the key generated by the AUC/HSS/HLR 121. In the case 3, the security key transmitted and stored at steps 227, 229, and 236 is the security master key derived using the key received from the USIM center 191 as the seed.

The AUC/HSS/HLR 121 sends the MME 114 the MID at step 227. Depending on the embodiment, the AUC/HSS/HLR 121 may send the MME 114 at least one of IMSI, security key (case 2)/security master key (case 3), and profile. The profile is the information necessary for configuring the UE 110 or USIM/UICC/SIM to be fit for the corresponding operator network. The profile may include at least one milenage algorithm representing the security function in AKA, SNOW (stream cipher: a new word stream cipher) cipher/integrity security algorithm, Advanced Encryption Standard ciphering/integrity protection security algorithm. The profile also may include at least one of access control class, emergency call codes, PLMN list, and home network domain.

The MME 114, MSC 188, and HSS 121 may participate in UE location registration with a CS network for SMS afterward. In the case that steps 213-11, 213-12, 213-13, 213-14, and 213-16 are not performed (case 2), steps 227-2, 227-3, 227-4, 227-5, and 227-7 may be performed. Steps 227-2 to 227-7 may be executed selectively. The MME 114 sends the MSC 188 a location registration request message. The location registration message may include the MID. Depending on the embodiment, the location registration request message may further include an MME identifier. The MSC 188 may store the mapping between MID and MME identifier at step 227-3. The MSC 188 sends the HSS 121 the MID and the address information (MSCA) of the MSC at step 227-4. The HSS 121 store the mapping between mid and MSCA 227-5. The HSS 121 sends the MSC 188 the MID at step 227-7. Depending on the embodiment, the HSS 121 sends the MSC 188 at least one of MSISDN and MSCA. Steps 227-2, 227-3, 227-4, 227-5, 227-7 are identical with steps 213-11, 213-12, 213-13, 213-14, and 213-16. Instead of steps 213-11, 213-12, 213-13, 213-14, and 213-16, steps 227-2, 227-3, 227-4, 227-5, and 227-7 may be performed.

The MME 114 may send the USIM center 191 the MID at step 229. Depending on the embodiment, the MME 114 may transmit at least one of IMSI, security (case 2)/security master key (case 3), profile, and security value.

Afterward, the USIM center 191 may send the USIM Central Center 180 the MID at step 231. Depending on the embodiment, the USIM center 191 may send the USIM central center 180 the USIM center verification value (Sec-USIM center verification value). The Sec-USIM center verification value is used for mutual authentication and security between the USIM central center 180 and the USIM center 191. That is, the Sec-USIM center verification value is used by the USIM central center 180 to verify the USIM center 191. In this way, it is possible to notify that the USIM center 191 has processed the request for the UE 110 represented by MID transmitted from the USIM central center 180 to the USIM center 191. The USIM central center 180 and the USIM center 191 may perform mutual authentication.

Upon receipt of the parameter, the USIM central center 180 verifies the Sec-USIM center verification value at step 233. At step 233, if the PKI system is used for verifying the Sec-USIM center verification value, the value may include the public key/security key. The Sec USIM center verification value may be a random value which is ciphered and deciphered with a shared key when the mutual authentication is applied. In the case of using AKA scheme, the Sec-USIM center verification value may be an authentication token value. Various values can be used as the Sec-central center verification value, and detailed description on the mutual authentication procedure is omitted herein.

The USIM central center 180 sends the USIM center 191 a confirm message at step 235. The confirm message is used to notify that the USIM center 191 has processed the request from the USIM central center 180 successfully. The confirm message also may notify of the success of the mutual authentication. In case 2 or 3, since the security key or security master key value is generated or modified at the AUC/HSS/HLR 121 at step 236, the USIM center 191 may store the security key/security master key value. If the USIM center 191 is responsible for storing the security information allocated by the operator in association with MID, the USIM center 191 may store the MID, security value, IMSI, security key/security master key, and profile.

Afterward, the USIM center 191 may sends the OTA server 182 the MID at step 237. Depending on the embodiment, the USIM center 191 may further send the OTA server 182 at least one of the security value, IMSI, security key/security master key, and profile. In the case that the TA ID list information is determined at step 219-3, the USIM center 191 sends the OTA server 182 the TA ID list.

If the USIM center 191 has not selected any MME for providing initial information at steps 219-2 and 219-3 or if the OTA server 182 is capable of selecting MME, the OTA server 182 may select an MME at step 237-2 and 237-3. That is, the OTA server 182 may select the MME to which the UE has connected or the MSC connected to the MME to which the UE has connected using at least one of PLMN ID, UE location information and UE-connected network information at step 237-2. The OTA server 182 may determine the MME or MSC for providing the UE within the initial information provision service using the above-described information. This embodiment has exemplified the case where the MME to which the UE has connected and the MCS connected to the corresponding MME deliver the initial information provision service to the UE. However, this method may be modified in various ways. That is, the selection method may be modified in various ways depending on whether the UE is served by the connected network operator or another operator. The OTA server 182 may determine the information such as tracking area identity list (TA ID list) at step 237-3. The tracking area is used in order for the MME to determine the eNB for delivery of the initial information provision service. Such information may be transmitted through the process following step 239.

The OTA server may send the Short Message Service Center (SMSC) the MID at step 239. Depending on the embodiment, the OTA server 182 may further send the SMSC 184 at least one of security value, IMSI, security key/security master key, and profile. In any case, the OTA server 182 may further send the TA ID list to the SMSC 184.

In the process of steps 239-2 to 241-2, the SMSC 184 may send the UE 110 the MID, security value, IMSI, security key/security master key, profile, and TA ID list. The process of steps 239-2 to 241-2 divided into several processes. According to the processes, the SMSC 184 sends the MSC 188 the MID, security value, IMSI, security key, profile, and other parameters. If the network as a target of the UE 110 is a Circuit Switched (CS) data service network, the related information and parameters are delivered to the UE 110 via the MSC 188. Otherwise if the network as a target of the UE 110 is a Packet Switched (PS) data service network, the related information and parameters are delivered to the UE 110 via the SMSC 184, MSC 188, and MME 114.

Steps 239-2 to 239-5 may be performed selectively.

The SMSC 184 sends the GMSC 187 the MID at step 239-2. According to an embodiment, the SMSC 184 may further send the GMSC 187 at least one of the security value, IMSI, security key/security master key, profile, and TA ID list. Afterward, the GMSC 187 sends the HSS 121 the MSISDN at step 239-3. The GMSC 187 receives the MSC address (MSCA) from the HSS 121. Afterward, the GSMC 187 sends the MCS 188 the MID at step 239-5. Depending on the embodiment, the GSMC 187 may further send the MSC 188 at least one of security value, IMSI, security key/security master key, profile, and TA ID list. Afterward, the MSC 188 sends the MME 114 the MID. Depending on the embodiment, the MSC 188 transmits at least one of the security value, IMSI, security key/security master key, profile, and TA ID list.

The MME 114 determines an eNB to which the received information is forwarded at step 239-7. The MME 114 may use the received TA ID list to make the determination. In the case that there is the eNB 112 and MME 114 used when the UE 110 has connected to the network as in this embodiment, the MME 114 selects the eNB 112 used for the connection with priority. The MME 114 sends the eNB 112 the MID and security value at step 241-1. The eNB 112 may send the UE 110 the MID and security value at step 241-2.

The UE 110 is capable of verifying whether the information is received in response to the request it has transmitted based on the security value at step 243. The UE 110 may notify the eNB 112 that the security value is verified successfully at step 243-2. The notification message may include MID. The eNB 112 may notify the MME 114 that the UE 110 has verified the security value successfully at step 243-3. Steps 243-2 and 243-3 may be executed selectively.

The MME 114 may update the primary search key of the database of the HSS 121 for communication and search afterward at step 243-4. Step 243-4 is performed to retrieve the information on the UE 110 from the HSS 121 efficiently and acquire synchronization of the database of the HSS. This process is optional depending on the implementation of the database of the HSS. Afterward, the MME 114 may send the eNB 112 the MID. Depending on the embodiment, the MME 114 may send the eNB 112 at least one of security value, IMSI, security key/security master key, profile TA ID list, and MSISDN. Afterward, the eNB 112 may send the UE 110 the MID at step 243-6. Depending on the embodiment, the eNB transmits at least one of security value, IMSI, security key/security master key, profile, and MSISDN. At this time, a method similar to paging can be used.

Afterward, if the above information is received, the UE 110 stores at least one of the profile, IMSI, security key/security master key, and MSISDN. The USIM 170 triggers the Attach procedure of the UE to the ME 111. The UE 110 sends the MME 114 the ATTAHC message via the eNB 112 at steps 249 and 251. The ATTACH message may include the IMSI as the UE identifier. Afterward, the MME 114 sends the UE 110 an ATTACH ACCEPT message via the eNB 112 at steps 259 and 261. Since the ATTACH procedure is well known, the description is directed to a part modified in the present invention herein.

Figure 6A:
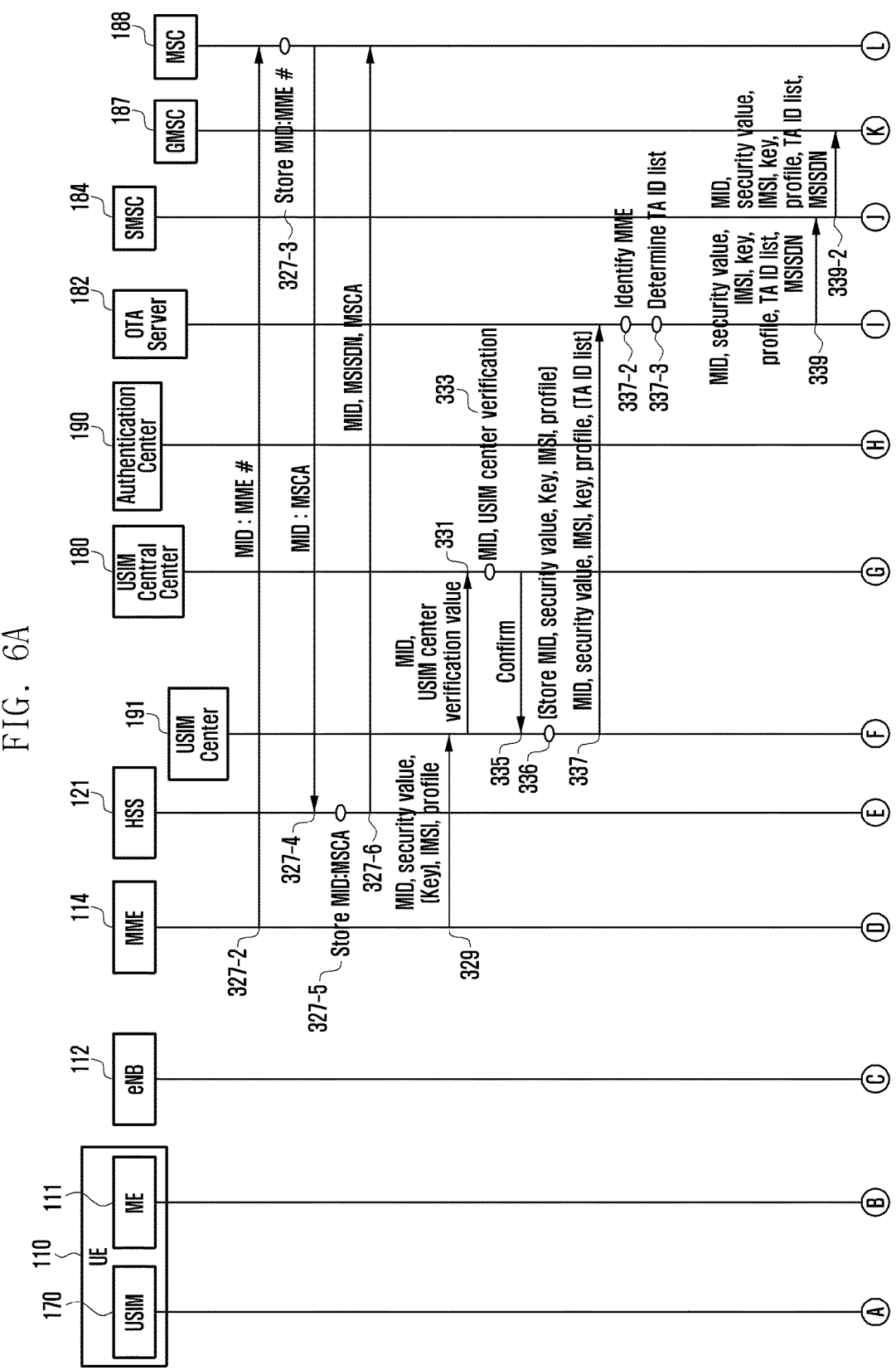
Figure 6B:
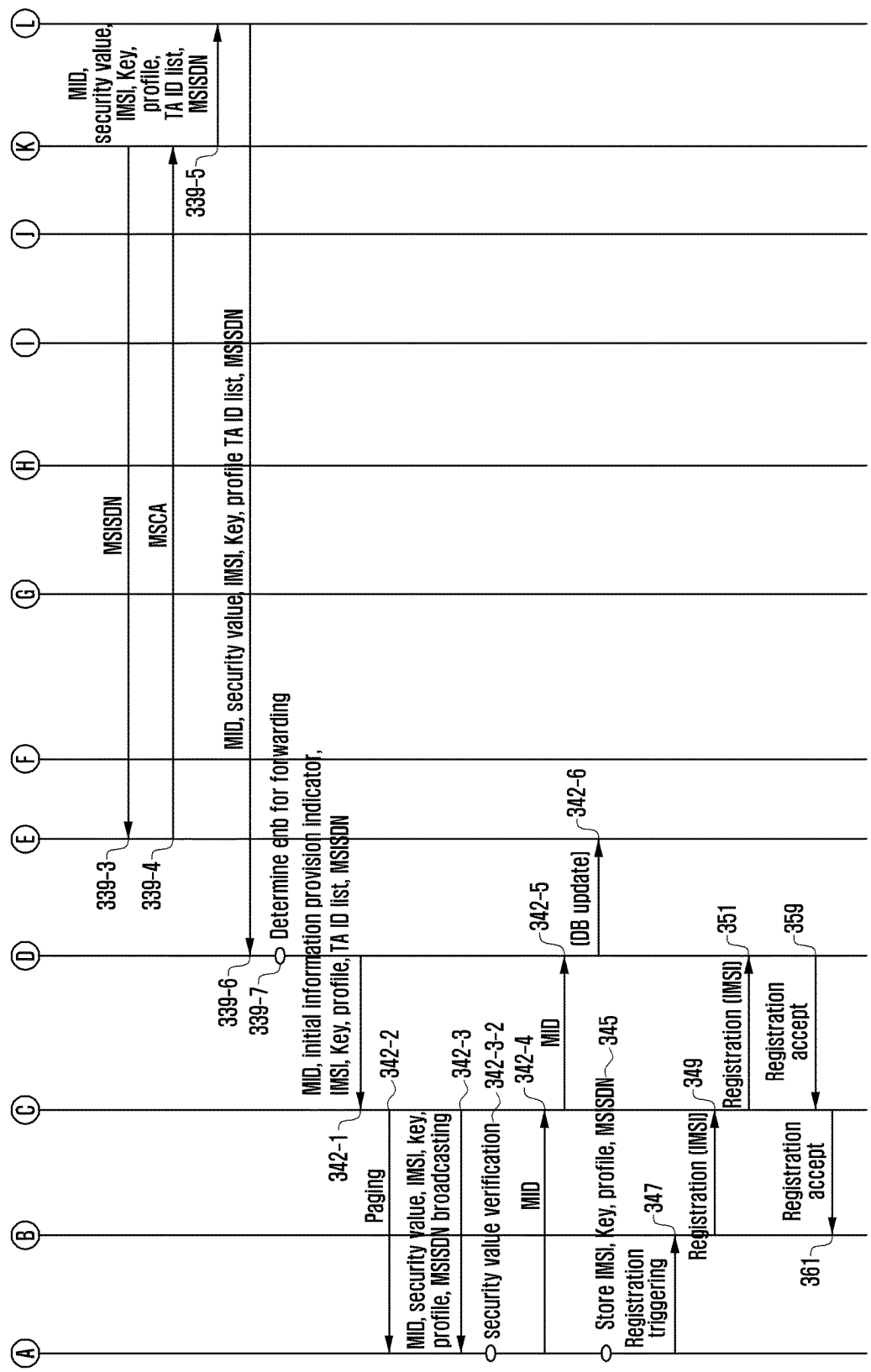
Figure 7A:
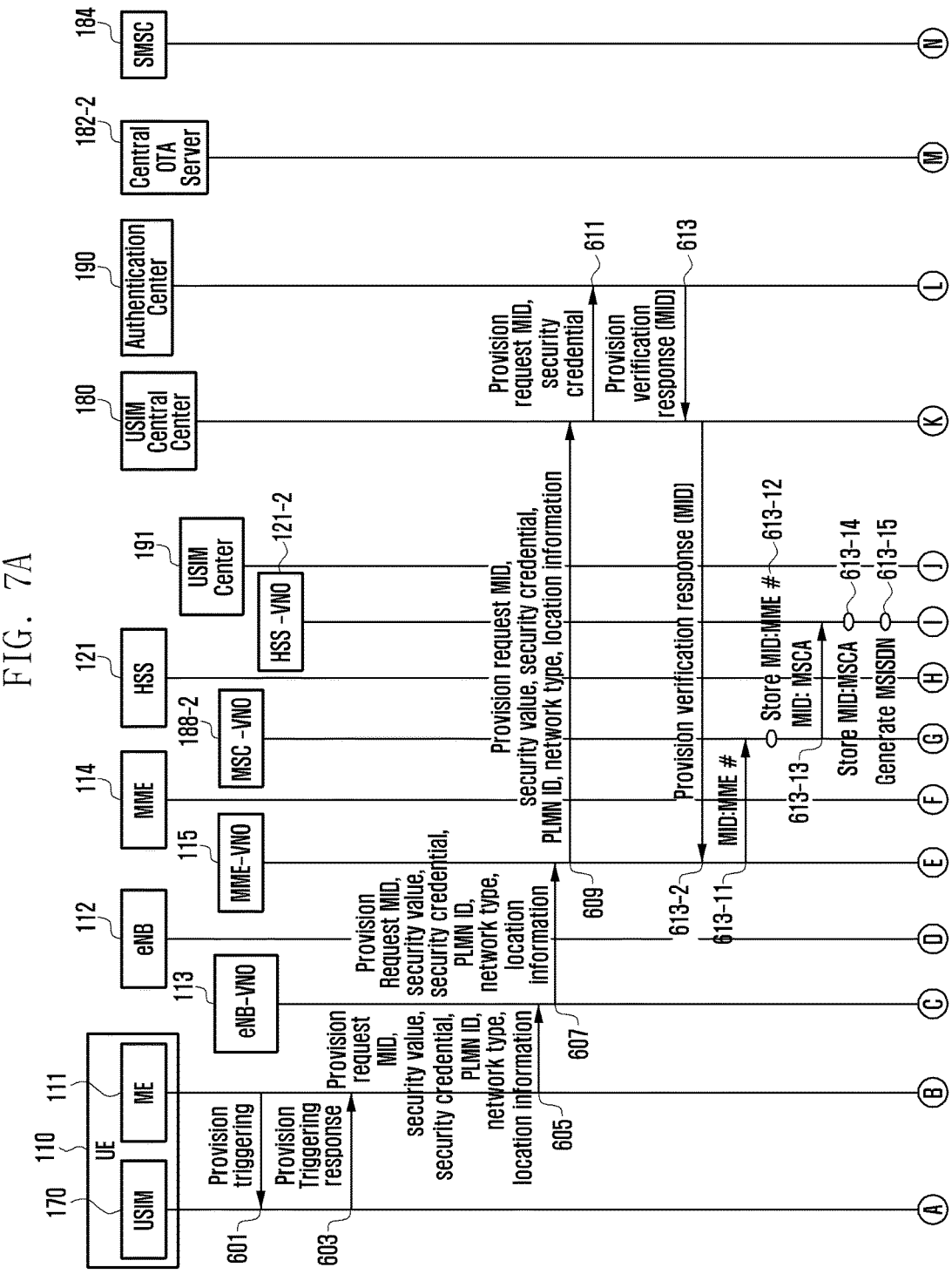
Figure 8A:
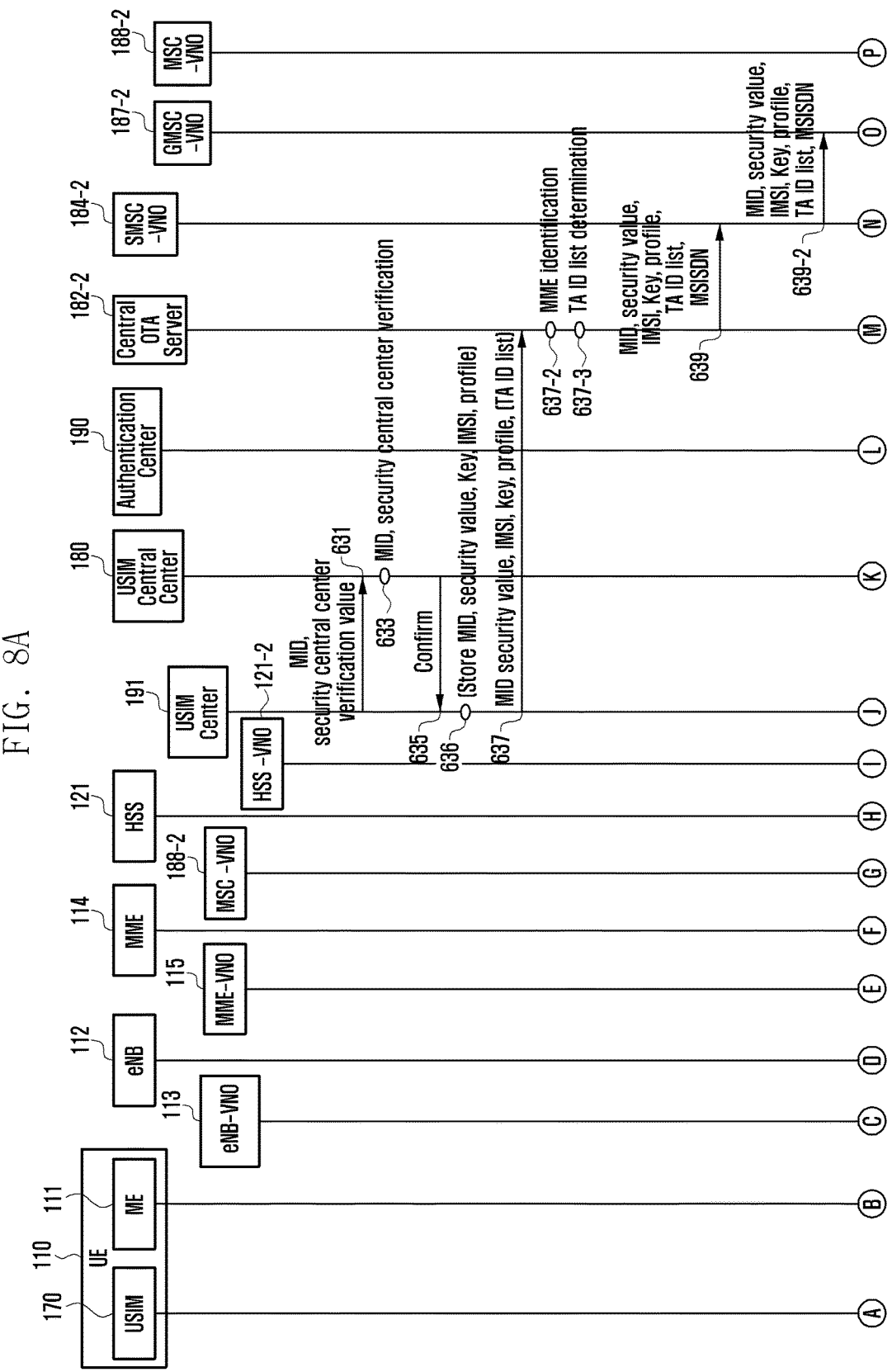
Figure 8B:
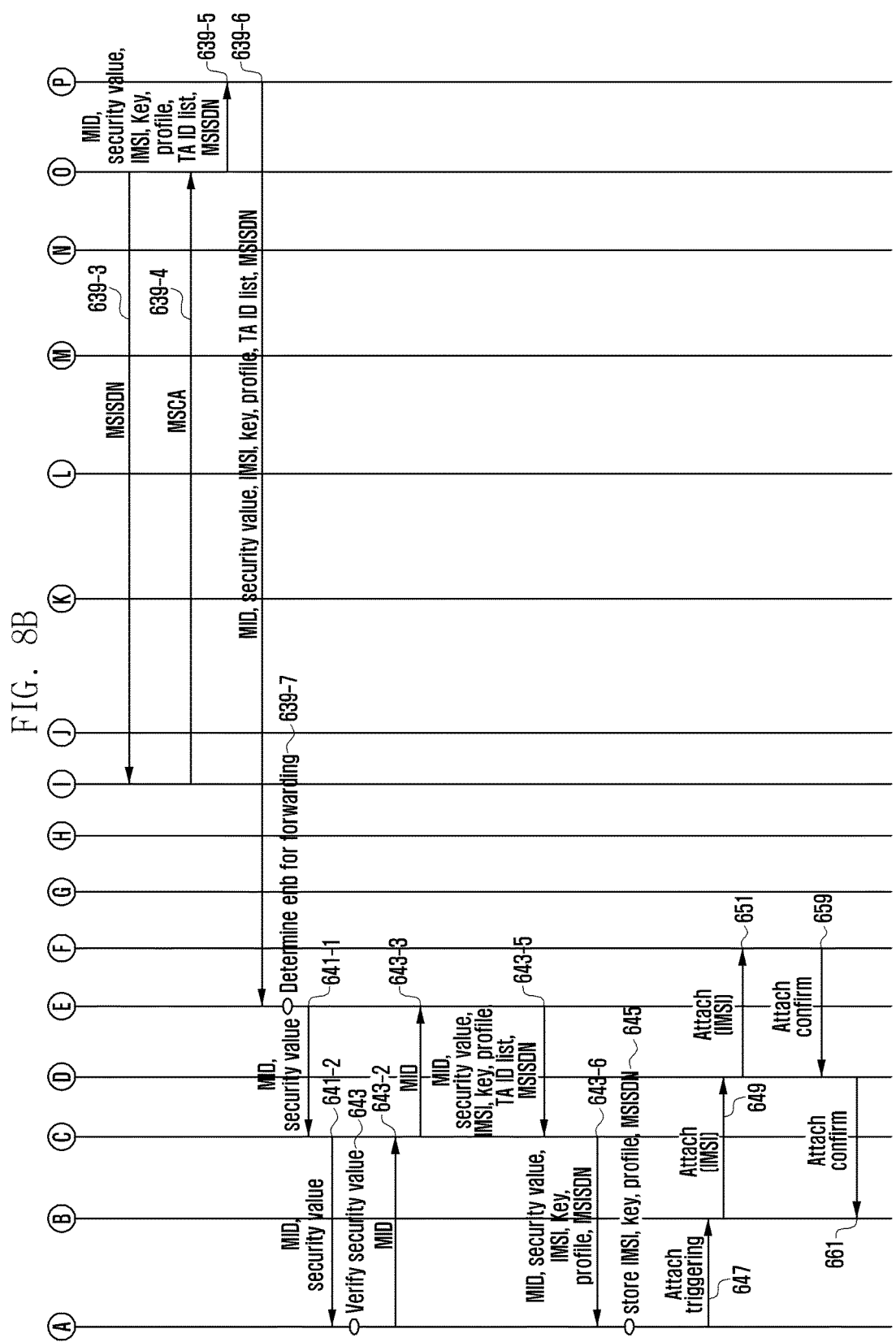

FIGS. 6a and 6b are a flow diagram illustrating the information provision procedure according to an embodiment of the present invention. FIGS. 6a and 6b are referred integrally to as FIG. 6. Since the process before the procedure of FIG. 6 is identical with first half part of the procedure of FIGS. 3 to 5b, i.e. a part of the FIG. 3, 4a, or 4b, and FIG. 6 is similar to FIGS. 5a and 5b, the description is directed to the different part of steps 339-7 to 342-6.

The MME 114 determines an eNB to which it forwards the received information at step 339-7. In order to make this determination, the MME may use the received TA ID list. If there is the eNB and MME to which the UE has connected in this embodiment, the MME 114 may select the corresponding eNB with priority to forward the received information. The MME sends the eNB 112 the MID at step 342-1. Depending on the embodiment, the MME 114 may further send the eNB 112 the indication notifying of transmitting information for initial information provision, MID, security value, IMSI, security key/security master key, profile, TA ID list, and MSISDN. The indication used at step 342-1 is a parameter indicating meaning of transmitting the information for initial information provision. Whether the MME 114 sends the message carrying the initial information to the eNB 112 connected to the MME as at step 342-1 or a specific eNB based on the TA list depends on the embodiment. The eNB 112 pages the UE 110 in the idle mode to receive the initial information provision message at step 342-2. The eNB 112 may send the UE 110 the MID at step 342-3. Depending on the embodiment, the eNB 1120 may further send the UE 110 at least one of security value, IMSI, security key/security master key, profile, and MSISDN. The eNB 112 may send the UE 110 such information in such a way of broadcasting in the system information message. The UE 110 verifies, based on the security value, that the information is received in response to the request which the UE 110 as a valid UE has as transmitted.

The process of steps 342-4 and 342-5 may be performed selectively.

The UE 110 notifies the eNB 112 of the success of the security value verification at step 342-4. The notification message may include MID. The eNB 112 notifies the MME 114 that the UE 110 has verified the security value successfully at step 342-5. The notification message may include MID. The MME 114 may update the primary search key of the database of the HSS for communication and search afterward at step 342-6. Step 342-6 is performed for the HSS 121 to search information on the UE 110 efficiently. Step 342 is performed to acquire synchronization of the database between the UE 110 and the HSS 121 corresponding to the UE 110 and facilitate search and may be skipped depending on the implementation of the database of the HSS 121.

FIGS. 7a to 8b are flow diagram illustrating the information provisioning procedure according to an embodiment of the present invention.

The information provision is triggered at step 601. The user may perform manipulation for selecting an operator through the interface of the UE 110. The user may select an operator first after purchasing the UE or USIM or changes the operator through a process of the present invention. The user also may enter a network of the corresponding operator to receive the service. That is, the user may select whether to use the 3G network or EUTRAN of the same operator. The UE 110 initiates the information provision procedure to receive the service from the corresponding operator. This procedure may be performed in such a way that the user selects a user interface of the UE 110. The user's selection input may be made to the ME 111 of the UE 110.

The USIM 170 sends the ME 111 the information provision triggering response at step 603. The information provision triggering response is a reply to the information provision triggering made at step 601.

The information provision initiation process is includes transmitting the information provision triggering from the ME 111 to the USIM 170 at step 601 and transmitting the provision triggering response from the USIM 170 to the ME 111 at step 603. Particularly, step 603 includes reading, at the UE 110, the information to be transmitted through the network from the USIM 170. Step 603 includes transmitting the corresponding information to the network.

At steps 605 and 607, the information provision request message is transmitted from the UE 110 to the MME (here, MME-VNO 115 in the visited network) via the eNB (here, eNB-VNO 113 in the visited network). The information provision request message is transmitted to the USIM central center 180 via the eNB-VNO 113 and the MME-VNO 115. In order for the UE 110 to receive the service from the corresponding operator network, there is a need of supplementary information such as the security information or identifier. At steps 605 and 607, the UE is in the state having no information for receiving the service in the corresponding operator network. If the UE requests for the initial information, this is the state capable of accessing the USIM central center 180 in a limited mode. If it is the situation of changing the operator, this means that it may be possible to operate in the normal communication mode.

The present embodiment is directed to the exemplary case where the UE 110 transmits the signal through the eNB 113 and MME 115 of the other operator network than the operator to which the UE 110 intends to subscribe. In this case, since the UE 110 has no information such as security key or identifier for use in the operator network, the service for connection to the USIM central center 180 of the visited network is permitted only in a significantly limited state.

The information provision request message may include the Mobile Identity (MID). Depending on the embodiment, the information provision request message may include at least on of security value, security credential, PLMN ID, network type, and UE location (loc.).

The MID is the identifier for use in identifying the UE 110 or USIM/SIM/UICC 170. The MID is assigned by the manufacturer (vendor) of the UE 110, the USIM/SIM/UICC 170, and used for identifying the UE 110 at the USIM central center 180. In the above description the USIM, SIM, and UICC are the modules or cards containing the subscriber authentication information for identifying the UE.

The information provision request message may include the security information along with the MID information. The representative security information includes the security value and credential.

The security value is used when the information provision request message is transmitted and the related message is received. The UE 110 compares the security value it has transmitted and the received message. Through this comparison, it is possible to check whether the received message is a malicious message transmitted by an attacker or other invalid node. That is, the security value is used to verify the message transmitted in response to a transmitted request message. Various values of the security algorithms such as security capability or random number generated by the UE can be used as the security value.

Typically, the security credential denotes the information including a pair of security and secret keys and certificate for use in the public key infrastructure (PKI) security scheme. In the present invention, however, the security credential denotes the information for use in verifying the valid UE at the USIM authentication center 190.

If the PKI scheme is used, the USIM authentication center 190 may use the security credential to authenticate the UE 110 or USIM 170 which has transmitted the authentication-related value in a normal method. In the Authentication and Key Agreement Protocol (AKA), the mutual authentication method can be used for authenticating the peer nodes mutually. In this case, the vector value related to the AKA may be the security credential. In the case of the authentication method using the random number of key value, the random value may be the security credential. Other various technologies can be used. In the following embodiment, if certain security information can be used for verifying the valid user, this can be called security credential.

The PLMN ID is also referred to as serving network ID. In order for the subscriber to provide the country information of the operator network for subscription and operator network information to the USIM center 191, the UE 110 may send the information on the network providing the service using the PLMN ID. The network type is the information on the type of the network providing the service. The network type may be the information on the type of the network of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). If the network type is included in the information provision request message, the UE 110 may use one of various network types provided by the corresponding operator selectively. That is, the UE 110 may select the wired/wireless link for use in receiving the service. The location information of the UE 110 can be used to determine the MME 114 or MSC 188 providing the user with the service or determining the tracking area providing the user with the service.

The MME-VNO 115 sends the USIM central center 180 an information provision verification request message at step 609. Upon receipt of the information provision request message from the UE 110, the MME-VNO 115 sends the USIM central center 180 the Information Provision Verification Request message. The information provision verification request message may include Mobile Identity (MID). Depending on the embodiment, the information provision verification request message may include at least one of security value, security credential, PLMN ID, network type, and network location information (loc.).

The above embodiment is directed to an exemplary case where the UE 110 selects an operator to which it intends to subscriber and sending the type of the network providing the service at the time when transmitting the information provision request message. However, if the operator to which the UE 110 has connected is the operator to which the operator intends to subscribe, an alternative embodiment can be applied. According to an alternative embodiment, when the MME sends the USIM central center the information provision verification request message at step 609 after the UE 110 has transmitted the information provision request message, the procedure may be modified such that the information such as network type of the network to which the MME belongs is provided together. Even when the network to which the UE 110 intends to subscribe and the network to which the UE 110 has connected at the time when it sends the information provision request message belonged to different operators, the network type information may be provided to the MME-VNO 115 of the visited network to which the UE has connected. However, this method is applicable only when the visited network knows the network type of the home network of the peer through exchange of the information on the network and service to which the UE intends to subscribe. The network type may be any of network times of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). That is, according to an alternative embodiment, the MME sends the USIM central center 180 the network type as well as the MID, security value, security credential, and PLMN ID transmitted by the UE.

The USIM central center 180 sends the USIM authentication center 190 the information provision verification request message at step 611. The information provision verification request message include MID. Depending on the embodiment, the information provision verification request message may further includes at least one of security credential, PLMN ID, and network type. The USIM central center requests for verifying whether the MID identifies the valid user accessible to the operator network using the information provision verification request message. In order to verify the information provision request, various security credentials can be used.

If the USIM authentication center 190 and the UE 110 use the PKI system, the public key and secret key of the PKI system is used as the security credential. That is, the USIM authentication center 190 authenticates the UE 110 or USIM 170 which has sent the authentication-related value using the public and secret keys. It may be used to authenticate peer nodes transmitted the value though the Authentication and Key Agreement protocol (AKA) mutually. In this case, the vector value used in AKA may be the security credential. In the case of using the authentication method based on the random number of key value, the random value can be used as the security credential. Other various candidate technologies may be used. In this embodiment, if there is any security information which the USIM authentication center 190 can use to verify the valid user, this can be referred to as security credential. A detailed procedure of using the security credential is not mentioned. However, the USIM Central Center 180 sends the USIM Authentication Center 190 the information provision verification request message and receives the information provision verification response message in replay at steps 611 and 613 as the corresponding procedure. In this case, the security parameter called security credential used at steps 611 and 613 may be determined depending on whether to use PKI or AKA scheme. In any case, however, it is possible to verify the valid access of the UE 110 based on the information provided by the UE 110 such as security parameter and identity called as security credential at steps 611 and 613. This verification procedure can be modified in various ways by those skilled in the art. The USIM Authentication center 190 sends the USIM Central Center the information provision authentication response message at step 613. The information provision authentication response message may include MID to indicate corresponding information provision authentication request verified successfully.

Steps 613-2 to 613-16 described hereinbelow may be executed selectively.

As described above, the USIM central center 180 receives a response message from the USIM authentication center 190 in replay to the information provision verification request. Then the USIM central center 180 sends the MME 115 the information provision response message. The information provision response message may include MID.

After the authentication step, the MME-VNO 115 of the visited network sends the MSC-VNO 188-2 the location registration request message at step 613-11. The location registration message may include MID and/or MME identifier. Afterward, the MSC-VNO 188-2 stores the mapping between the MID and MME identifier at step 613-12. Depending on the embodiment, the MSC-VNO 121-2 may generate MSISDN. Here, the generated MSISDN may be used as the identifier for used in CS network communication. The MSISDN is used for transmitting the initial information. The HSS-VNO 121-2 sends the MSC-VNO 188-2 the MID. Depending on the embodiment, the HSS-VNO 121-2 may further sends the MSC 188-2 at least one of MSISDN and MSCA.

The USIM central center 180 sends the USIM center 191 the MID at step 615. Depending on the embodiment, the USIM central center 180 may further transmit at least one of the security value, PLMN ID, network type, security central center (Sec-Central center) verification value, and UE location information (loc.). The Sec-Central center verification value is used for mutual authentication and security between the USIM central center 180 and the USIM center 191. That is, the security central center verification value is used for verifying the USIM central center 180 at the USIM center 191. In the case of using the PKI system for verification, the sec-central center verification value may be a value including the public key/secret key. In the case of using a method for mutual authentication, the Sec-central center verification value may be a random number ciphered and deciphered with a shared key for transmission. In the case of using the AKA method, the Sec-central center verification value may be the authentication token value. Various values can be used as the Sec-central center verification value, and detailed description on the mutual authentication procedure is omitted herein.

Upon receipt of the parameter, the USIM center 191 verifies the Sec-central center verification value at step 617.

The USIM center 191 may generate a security key at step 619. This corresponds to an embodiment (case 1) in which the USIM center 191 generates and distributes the security key. According to another embodiment (case 2), the USIM center 191 has no security generation function. In this embodiment, the AUC/HSS/HLR 121 is responsible for the corresponding function. That is, the AUC/HSS/HLR 121 generates the security key which may be used as the master key (root key) allocated to the corresponding operator in itself. According to another embodiment (case 3), the USIM center 191 generates the security key to the operator and the operator uses this key as the seed for generating the security master key as operator-specific reinforced key. That is, the USIM center 191 generates the security key. The AUC/HSS/HLR 121 of the operator network generate another derived master key (Kdm) working as the role of the master used in the operator network using the security key as a seed. The master key may be the root key as the security key or the derived master key (Kdm). On the basis of such a master key, the operator network generates authentication key (KASME). The operator network generates a NAS integrity key (KNASint) and NAS cipher key (KNASenc).

The USIM center 191 determines the MME to which the UE has connected or the MSC connected to the MME to which the UE has connected or another MME or MSC to provide the UE with the initial information provision service at step 619-2. The USIM center 191 may use at least one of PLMN ID, UE location information, and UE-connected network information to make such a determination. In this embodiment, the MME to which the UE 110 has connected and the MSC connected to the corresponding MME provide with UE 110 with the initial information provision service. However, this method can be modified in various ways. That is, such a selection method can be modified in various ways depending on whether which operator provides the service instead to the network operator to which the UE has been connected.

Afterward, the USIM center 191 may determine an identity (ID) list of tracking areas (UE location registration area) at step 619-3. The tracking area may be used by the MME to select the eNB for delivery of the initial information provision service. The TA ID list is sent in the process after step 637 or 639. The MME may be selected by the USIM center 191. In a certain case, however, the central OTA server 182-2 may be responsible for such function as being described with reference to steps 637-2 and 637-3 which are described hereinafter.

In an embodiment (case 1), if the USIM center 191 generates and stores the security key at step 619, it sends the MME 114 of the operator network to which the UE 110 intends to subscribe at least one of MID as UE or USIM/UICC/SIM identifier, security value, PLMN ID, and network type. Afterward, the MME 114 sends the HSS/HLR 121 the MID and security value at step 623. If the USIM center 191 generates the security key, the MME may send the HSS/HLR 121 the security key too. The AUC/HSS/HLR 121 generates and stores the IMSI as the identifier of the UE 110 at step 625. If the USIM center 191 has not generated the security key at step 619, the AUC/HSS/HLR 121 generates and stores the security key according to another embodiment (case 2). The AUC/HSS/HLR 121 may generate and store the Mobile Station International Integrated Services Digital Network Number (MSISDN) necessary for communication in a CS network at step 625. In this case, since the MSISDN generated at step 613-15 is used for transmitting information for information provision to the UE 110 and the MSISDN assigned at step 625 is used as the identifier for use in the new network of the UE, they are different from each other in property. According to another embodiment, although in a different operator network, the MSISDN for use in transmitting information for the information provision to the UE 110 and the MSISDN for use in the new network may be set to the same value. Unlike the above example (case 1), the AUC/HSS/HLR 121 generates the security in another embodiment (case 2). In still another embodiment (case 3), a master key (derived master key) is generated using the security key sent by the USIM center 191 as a seed, the derived master key (Kdm) being used as the security master key. In the case 1, the security key transmitted stored at steps 627, 629, and 636 is the security key generated by the USIM center 191. In the case 2, the security key transmitted and stored at steps 627, 629, and 636 is the key generated by the AUC/HSS/HLR 121. In the case 3, the security key transmitted and stored at steps 627, 629, and 636 is the security master key derived using the key received from the USIM center 191 as the seed.

The AUC/HSS/HLR 121 sends the MME 114 the MID at step 627. Depending on the embodiment, the AUC/HSS/HLR 121 may further send the MME 114 the IMSI, security key (case 2)/security master key (case 3), and profile information. The profile is the information necessary for configuring the UE 110 or USIM/UICC/SIM to be fit for the corresponding operator network. The profile may include at least one milenage algorithm representing the security function in AKA, SNOW (stream cipher: a new word stream cipher) cipher/integrity security algorithm, Advanced Encryption Standard ciphering/integrity protection security algorithm. The profile also may include at least one of access control class, emergency call codes, PLMN list, and home network domain.

The MME 114 sends the USIM center 191 the MID at step 629. Depending on the embodiment, the MME 114 sends the USIM center 191 at least one of IMSI, security key (case 2)/security master key (case 3) profile information, and security value.

The USIM center 191 sends the USIM central center 180 the MID at step 631. Depending on the embodiment, the USIM center 191 may send the USIM central center 180 the USIM center verification value (Sec-USIM center verification value). The Sec-USIM center verification value is used for mutual authentication and security between the USIM central center 180 and the USIM center 191. That is, the Sec-USIM center verification value is used for verifying the USIM center 191 at the USIM central center 180. Through this, it is possible to notify that the request to the UE 110 corresponding to the MID transmitted from the USIM central center 180 to the USIM center has been processed successfully. Also, mutual authentication may be performed between the USIM central center and the USIM center 191.

Upon receipt of the parameter, the USIM central center 180 verifies the Sec-USIM center verification value at step 633. In the case of using the PKI system for verifying the Sec-USIM center verification value at step 633, the value may include the public key/secret key. In the case of using the method for mutual authentication, the Sec-USIM key center verification value may a random value which is ciphered and deciphered with a shared key. In the case of using AKA scheme, the Sec-USIM center verification value may be an authentication token value. Various values can be used as the Sec-central center verification value, and detailed description on the mutual authentication procedure is omitted herein.

The USIM central center 180 sends the USIM center 191 a confirm message at step 635. The confirm message is used to notify that the USIM center 191 has processed the request from the USIM central center 180 successfully. The confirm message also may notify of the success of the mutual authentication. In case 2 or 3, since the security key or security master key value is generated or modified at the AUC/HSS/HLR 121 at step 636, the USIM center 191 may store the security key/security master key value. If the USIM center 191 is responsible for storing the security information allocated by the operator in association with MID, the USIM center 191 may store the MID, security value, IMSI, security key/security master key, and profile.

Afterward, the USIM center 191 may sends the central OTA server 182-2 the MID at step 637. Depending on the embodiment, the USIM center 191 may further send the central OTA server 182-2 at least one of the security value, IMSI, security key/security master key, and profile. In the case that the TA ID list information is determined at step 619-3, the USIM center 191 sends the central OTA server 182-2 the TA ID list.

If the USIM center 191 has not selected any MME for providing initial information at steps 619-2 and 619-3 or if the central OTA server 182-2 is capable of selecting MME, the central OTA server 182-2 may select an MME at step 637-2 and 637-3. That is, the OTA server 182 may select the MME to which the UE has connected or the MSC connected to the MME to which the UE has connected using at least one of PLMN ID, UE location information and UE-connected network information. The central OTA server 182-2 may determine the MME or MSC for providing the UE within the initial information provision service using the above-described information. This embodiment has exemplified the case where the MME to which the UE has connected and the MCS connected to the corresponding MME deliver the initial information provision service to the UE. However, this method may be modified in various ways. That is, the selection method made modified in various ways depending on whether the UE is served by the connected network operator or another operator. The central OTA server 182-2 may determine the information such as tracking area identity list (TA ID list) at step 637-3. The tracking area is used in order for the MME to determine the eNB for delivery of the initial information provision service. Such information may be transmitted through the process following step 639.

The central OTA server 182-2 may send the Short Message Service Center (SMSC-VNO) 184-2 the MID at step 639. Depending on the embodiment, the central OTA server 182-2 may further send the SMSC-VNO 184-2 at least one of security value, IMSI, security key/security master key, and profile. In any case, the central OTA server 182-2 may further send the TA ID list to the SMSC-VNO 184-2.

In the process of steps 639-2 to 641-2, the SMSC-VNO 184-2 may send the UE 110 the MID, security value, IMSI, security key/security master key, profile, and TA ID list. The process of steps 639-2 to 641-2 divided into several processes. According to the processes, the SMSC-VNO 184-2 sends the MSC-VNO 188-2 the MID, security value, IMSI, security key, profile, and other parameters. If the network as a target of the UE 110 is a Circuit Switched (CS) data service network, the related information and parameters are delivered to the UE 110 via the MSC-VNO 188-2. Otherwise if the network as a target of the UE 110 is a Packet Switched (PS) data service network, the related information and parameters are delivered to the UE 110 via the SMSC-VNO 184-2, MSC-VNO 188-2, and MME-VNO 115.

Detailed procedure is as follows.

Steps 239-2 to 239-5 may be performed selectively.

The SMSC-VNO 184-2 sends the GMSC-VNO 187-2 the MID at step 639-2. According to an embodiment, the SMSC-VNO 184-2 may further send the GMSC-VNO 187-2 at least one of the security value, IMSI, security key/security master key, profile, and TA ID list. Afterward, the GMSC-VNO 187 sends the HSS-VNO 121-2 the MSISDN at step 639-3. The GMSC-VNO 187-2 receives the MSC address (MSCA) from the HSS-VNO 121-2. Afterward, the GSMC-VNO 187-2 sends the MCS-VNO 188-2 the MID at step 639-5. Depending on the embodiment, the GSMC-VNO 187-2 may further send the MSC-VNO 188-2 at least one of security value, IMSI, security key/security master key, profile, and TA ID list. Afterward, the MSC-VNO 188-2 sends the MME-VNO 115 the MID. Depending on the embodiment, the MSC-VNO 188-2 transmits at least one of the security value, IMSI, security key/security master key, profile, and TA ID list.

The MME-VNO 115 determines an eNB to which the received information is forwarded at step 639-7. The MME-VNO 115 may use the received TA ID list to make the determination. In the case that there is the eNB-VNO 113 and MME-VNO 115 used when the UE 110 has connected to the network as in this embodiment, the MME-VNO 115 selects the eNB-VNO 113 used for the connection with priority. The MME-VNO 115 sends the eNB-VNO 113 the MID and security value at step 641-1. The eNB-VNO 113 may send the UE 110 the MID and security value at step 641-2.

The UE 110 is capable of verifying whether the information is received in response to the request it has transmitted based on the security value at step 643.

Steps 643-2 and 643-3 may be executed selectively.

The UE 110 may notify the eNB-VNO 113 that the security value verification is successful at step 643-2. The eNB-VNO 113 may notify the MME-VNO 115 that the security value verification is successful at the UE 110 at step 643-3. The notification message may include MID. Afterward, the MME-VNO 115 may send the MME-VNO 115 the MID at step 643-5. Depending on the embodiment, the MME-VNO 115 may sends the eNB-VNO 113 at least one of security value, IMSI, security key/security master key, profile, TA ID list, and MSISDN. Afterward, the eNB-VNO 113 sends the UE 110 at least one of the mid, security value, IMSI, security key/security master key, profile, and MSISDN at step 643-6. At this time, a method similar to paging can be used.

Afterward, if the above information is received, the UE 110 stores at least one of the profile, IMSI, security key/security master key, and MSISDN at step 645. The USIM 170 triggers the Attach procedure of the UE to the ME 111. The UE 110 sends the MME 114 the ATTAHC message via the eNB 112 at steps 649 and 651. The ATTACH message may include the IMSI as the UE identifier. Afterward, the MME 114 sends the UE 110 an ATTACH ACCEPT message via the eNB 112 at steps 659 and 661. Since the ATTACH procedure is well known, the description is directed to a part modified in the present invention herein.

Figure 9A:
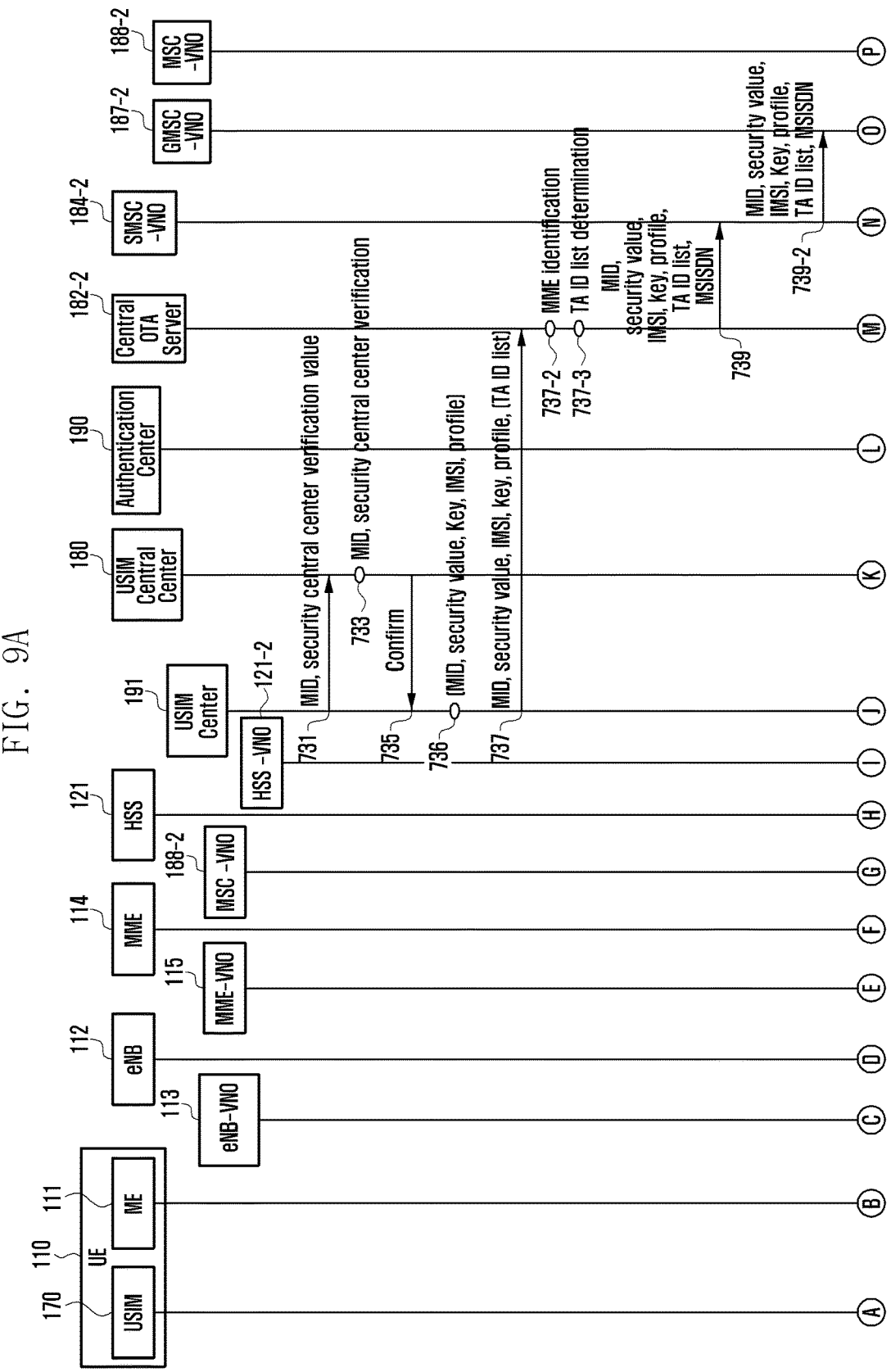
Figure 10A:
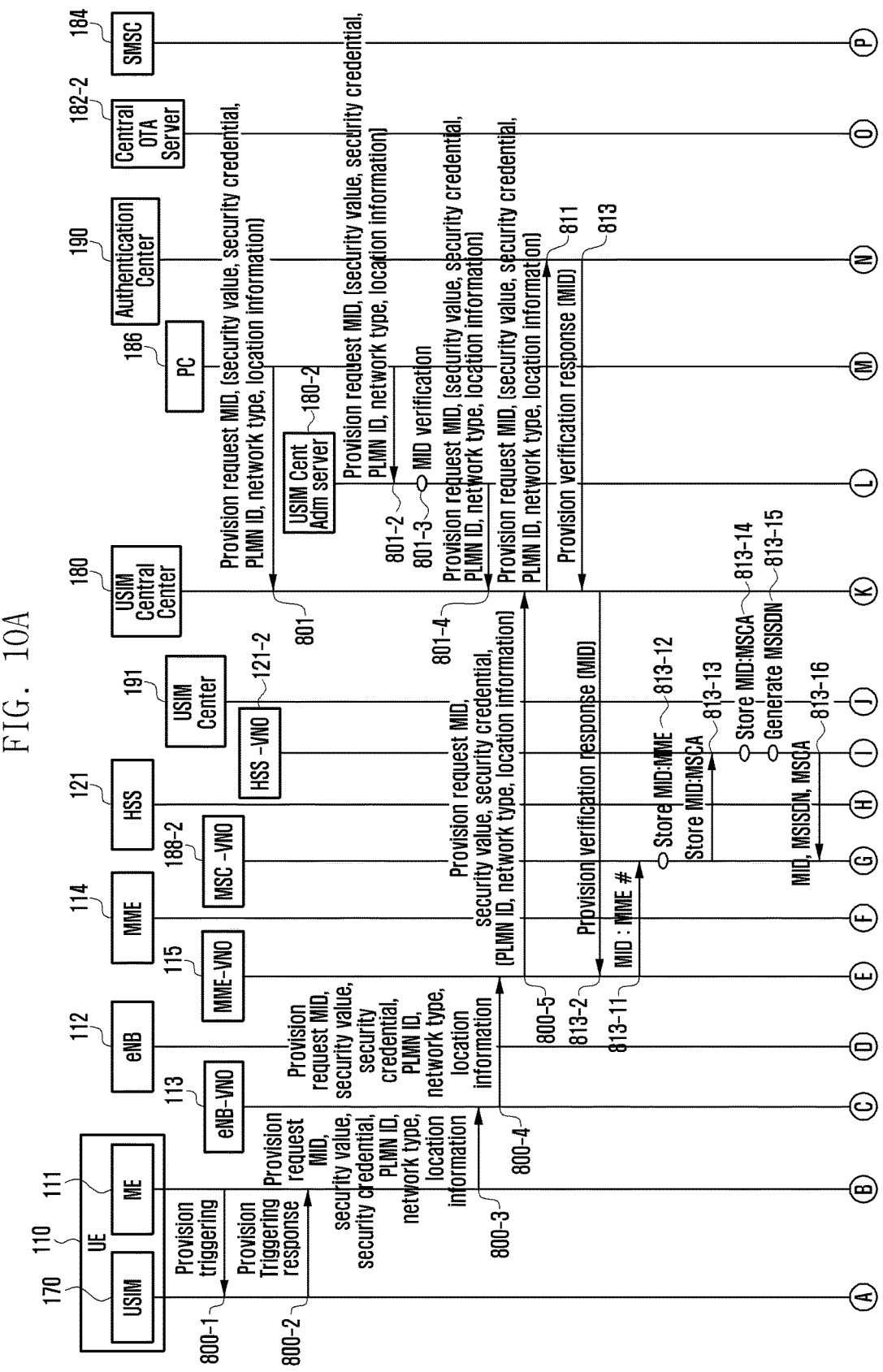
Figure 10B:
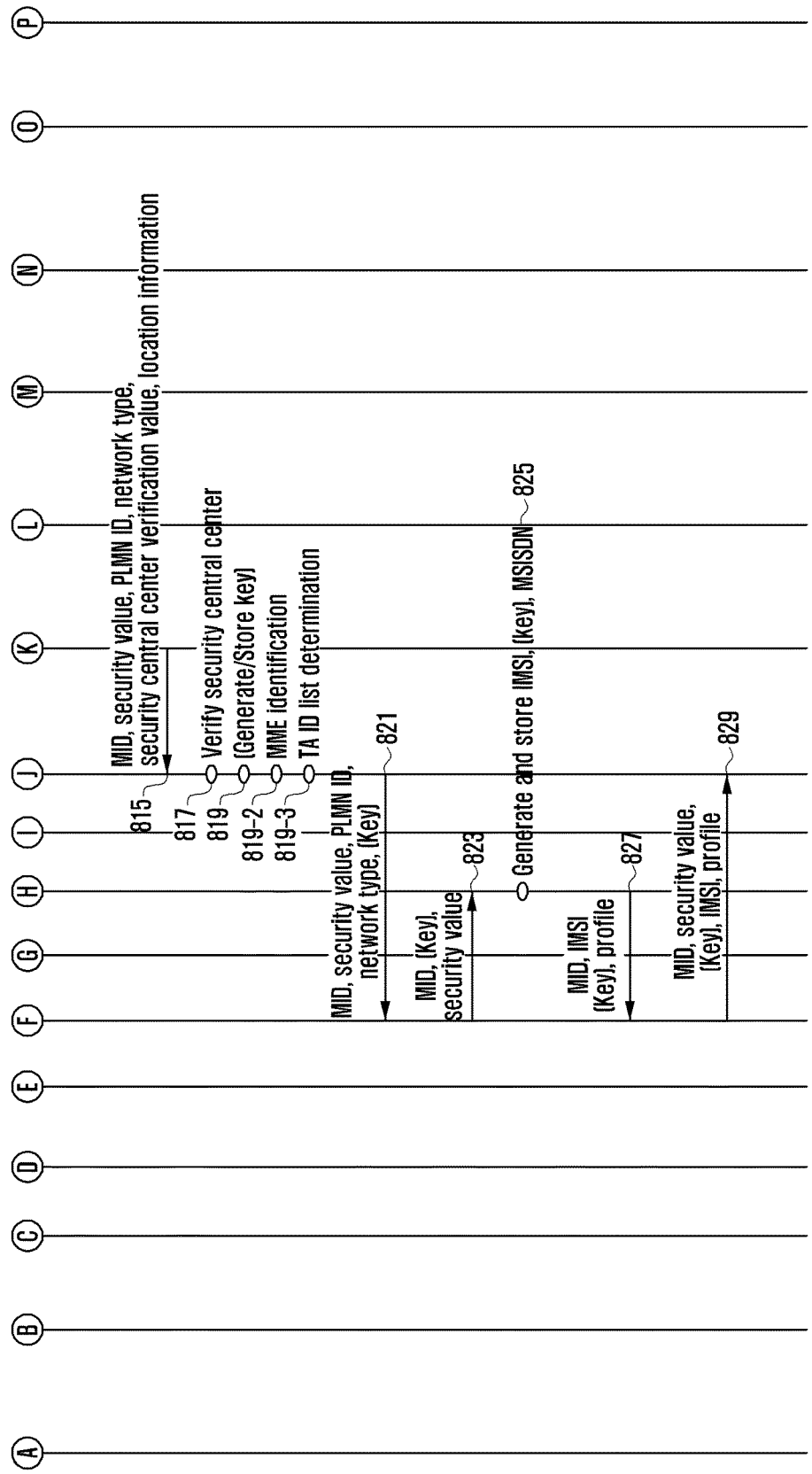
Figure 11A:
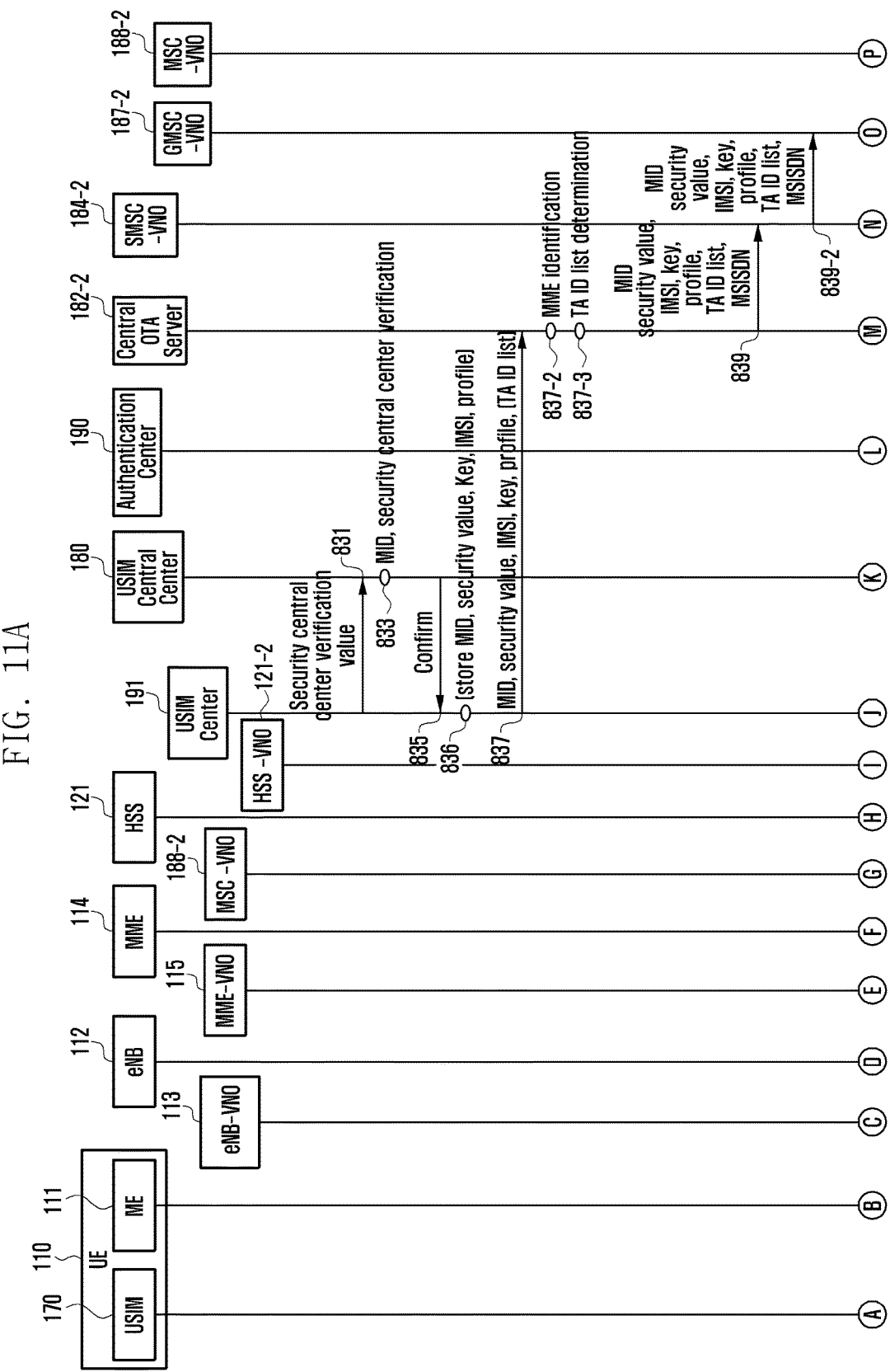
Figure 11B:
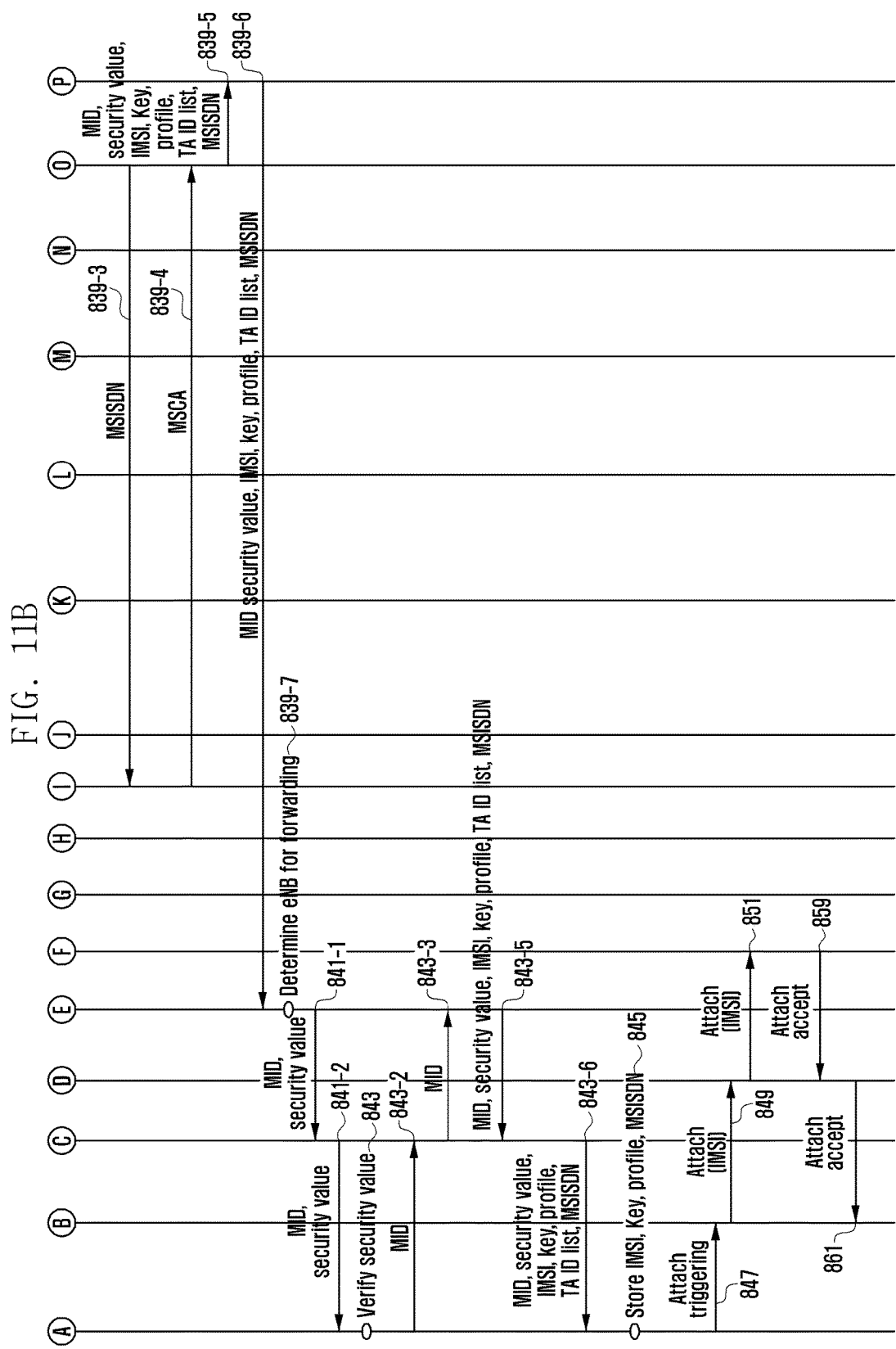

FIGS. 9a and 9b are a flow diagram illustrating the information provisioning procedure according to an embodiment of the present invention. Since the first part of the procedure of FIGS. 9a and 9b is similar to the corresponding part of FIGS. 7a to 8b, the description is mainly directed to the different part of steps 739 to 742-6.

The MME-VNO 115 determines the eNB to which the received information is forwarded at step 739-7. The MME-VNO 115 may use the received TA ID list for this determination. As in this embodiment, if there is the eNB and MME used when it connects to the network, the MME-VNO 115 determines the corresponding eNB for forwarding the received information with priority. The MME-VNO 115 sends the eNB-VNO 113 the MID at step 742-1. Depending on the embodiment, the MME-VNO 115 may further send the eNB-VNO 113 the indication notifying of transmitting the information for initial information provisioning, MID, security value, IMSI, security key/security master key, profile, TA ID list, and MSISDN. The indication of step 742-1 is a parameter which can be used to indicate that the initial provisioning information is transmitted, and may be modified depending on whether the MME-VNO 115 sends the message containing initial provision information to the eNBs connected to the MME as step 742-1 or specific eNB based on the TA list.

The eNB-VNO 113 pages the UE 110 in the idle mode to receive the initial provisioning message at step 742-2. The eNB-VNO 1130 may send the UE 110 the MID, security value, IMSI, security key/security master key, profile, and MSISDN in the system information message broadcast at step 742-3. The UE 110 checks whether the information is received in response to the request it has transmitted using the security value at step 742-3-2.

The process of steps 742-4 and 742-5 may be performed selectively.

The UE 110 notifies the eNB-VNO 113 of the success of the security value verification at step 742-4, and the eNB-VNO 113 notifies the MME-VNO 115 that the success of the security value verification at UE 110 at step 742-5. Each notification message may include MID.

FIGS. 10a to 11b are flow diagrams illustrating the information provisioning procedure according to an embodiment of the present invention.

The UE 110 powers on to request for initial information. The UE 110 has to be in the power-on state for progress of the procedure even when it does not request for information provisioning directly.

The user selects an operator through the user interface of the UE 110 at step 800-1. This includes the steps of selecting an operator initially after purchasing a UE or a USIM, notifying the corresponding operator of a target network for use in receiving the service, and initiating the information provision process for receiving the service from the operator. In this procedure, the user selects the operator through the user interface of the UE. Particularly, this is performed through the ME 111 of the UE, and the information provision initiation is performed in such a way that the ME 111 the USIM 170 the information provision triggering at step 800-1 and the USIM 170 sends the ME 111 a provision triggering response at step 800-2. Particularly at step 800-2, the UE 110 reads information to be transmitted through the network from the USIM 170 and prepares to transmit the information to the network. The UE 110 sends the MME (here, MME-VNO of the visited network) 115 the information provision request message via the eNB (here, eNB-VNO of the visited network) at steps 800-3 and 800-4. Although FIGS. 10a to 12b of this embodiment exemplify the ease where the UE 110 initiates the access to the visited network, it is possible to attempt the access through the home network according to a combination of FIGS. 3 to 6b. At steps 800-3 and 800-4, the information provision request message is transmitted to the USIM central center via the eNB-VNO 113 and the MME-VNO 115. Since the UE 110 has no supplementary information such as security information and identifier for receiving a service in the corresponding service network yet, it may just access the USIM central center in a limited mode. Accordingly, this embodiment exemplifies a case where the UE 110 sends the information using the eNB-VNO 113 and MME-VNO 115 of an operator network different from the operator network to which the UE 110 intends to subscribe, i.e. the visited network. In this case, the visited network assists the network access of the UE such that the connection to the USIM central center 180 is in very limited state. Meanwhile, the information provision request message may include at least one of Mobile Identity (MID), security value, security credential, Public Land Mobile Network identity (PLMN ID), network type, and UE location information (loc.). The MID is the identifier for identifying the corresponding UE or USIM/SIM/UICC at the USIM central center and assigned by the manufacturer (vendor) of the USIM/SIM/UICC. The USIM/ISM/UICC is provided in the form of a module or card containing the subscriber authentication information capable of identifying the subscriber. The security information provided along with the MID information includes the security value and security credential. The security value is used to verify whether to check whether the received message is malicious message transmitted by an attacker or other invalid node by comparing the information provision value received in response to the information provision request message with the transmitted value, and verify whether it is the value valid as a response to the request it has transmitted. Accordingly, various values of the security algorithms such as security capability or random number generated by the UE can be used as the security value.

Typically, the security credential is composed of a pair of public key and secret key and a certificate in the public key infrastructure (PKI) security method. In the present invention, however, the security credential is a general expression on the information capable of being used for verification of the valid terminal used in the USIM authentication center 190 as well as such information.

If the PKI method is used, the USIM authentication center 190 may use the security credential to authenticate the UE 110 or USIM 170 which has transmitted the authentication value as a method used in general. It may be used to authenticate peer nodes transmitted the value though the Authentication and Key Agreement protocol (AKA) mutually. In this case, the vector value used in AKA may be the security credential. In the case of using the authentication method with random number and key value, the random value may be sued as the security credential. Other various candidate technologies may be used. In the following embodiment, if there is any security information which the USIM authentication center 190 can use to verify the valid user, this can be referred to as security credential.

The PLMN ID is also referred to as serving network ID. In order for the subscriber to provide the country information of the operator network for subscription and operator network information to the USIM center 191, the UE 110 may send the information on the network providing the service using the PLMN ID. The network type is the information on the type of the network providing the service. The network type may be the information on the type of the network of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). If the network type is included in the information provision request message, the UE 110 may use one of various network types provided by the corresponding operator selectively. That is, the UE 110 may select the wired/wireless link for use in receiving the service. The location information of the UE 110 can be used to determine the MME 115 or MSC 188-2 providing the user with the service or determining the tracking area providing the user with the service.

Afterward, upon receipt of the provision request message from the UE 110, the MME-VNO 115 sends the USIM central center 180 the information provision verification request message including the MID, security value, security credential, PLMN ID, network type, and UE location information (loc.). Although the present embodiment exemplifies the case where the UE 110 selects an operator to which it intends to subscribe and sends the information provision request message along with the type of the network for use in receiving the service, if the operator to which the UE 110 has connected is the operator to which the UE 110 intends to subscribe, it may be possible for the MME provides the network type information on the network to which the MME belongs in the information provision verification request message transmitted to the USIM central center at step 800-5 after the UE has transmitted the information provision request message other that the time when the UE transmits the information provision request message as step 800-3 and 800-4 in an alternative embodiment. Although the network type information may be provided by the MME of the visited network to which the UE has connected even when the network to which the UE 110 intends to subscribe and the network to which the UE has connected in sending the information provision request message belong to different operators, this may be restricted to the case where the visited network of the UE has a capability of checking the type of the network type of the home network of the peer through agreement on the service with the network to which the UE intends to subscribe. The network type may be the information on the type of the network of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). That is, in the alternative embodiment, the network type is sent to the USIM central center 180 along with the MID, security value, security credential, and PLMN ID.

Step 801 is a process for transmitting information provision request message or initiating information provisioning using an information processing device capable of connecting to Internet such as computer and network for executing the information provisioning procedure for the UE 110. The information provisioning request include the MID, security value, security credential, PLMN ID, network type, and UE location information (loc.) for providing the UE with the information necessary for the UE to connect an operator network.

According to another embodiment, for the PC-based initial connection, the MID may be replaced with a provision ID. The provision ID is assigned by the manufacturer (vendor) of the UE 110 or USIM/SIM/UICC 170. Since the MID is important security information, it is transmitted from the UE to the network and, when it is necessary to input the UE-related information to the PC, the provision ID is used instead of the MID to prevent the MID from being input to the PC 186. The provision ID can be used at steps 810 to 801-4 instead of the MID. That is, the user input the provision ID of the UE 110 to the PC 186, and the system identifies the UE 110 and input based on the provision ID. The provision ID of the UE 110 may be transmitted independently of the MID at steps 800-3 to 800-5. The USIM central center 180 is capable of integrating the information provision verification request of step 800-5 and information provision request of step 800-4 to synchronize the information at step 811 and continuing subsequent processes.

Particularly, the aforementioned parameters are the unique values of the UE or the informations necessary for the UE to operate in the operator network and thus it is required to input the corresponding values accurately using the method capable of reading the values set initially in the UE 110. In an embodiment, in order to read the values set in the UE 110, the UE or USIM manufacturer provides an interface or application capable of handling the corresponding parameters in the information device. That is, the corresponding application program is capable of reading the information from the USIM and preparing transmission of the information through the network. The location information of the UE can be used for determining the MME 114 and MSC 188 providing the service and the tracking area for receiving the service. In the case of the location information of the UE, since the initial information provision location is the location where the UE powers on due to the execution of the application, the UE provides the location information at the location where the UE powers on such that it is possible whether the UE operates. That is, it may be a way to request for the initial information for use in the UE after the UE powers on.

This step corresponds to the state where the UE 110 has no supplement information such as security information and identifier for use in receiving service in the corresponding operator network and, since the request makes other information device read basic information of the UE 110 to connect to the USIM central center through a network such as Internet, the USIM central center is also in the state allowing for access in the limited mode.

In an embodiment of the present invention, the information is provided through the triggering process of steps 800-1, 800-2, 800-3, 800-4, and 800-5 (hereinafter, referred to integrally as 800-*x*) from the UE and through Internet by means of the information device represented by PC. The process 800-*x* includes a process where the UE prepares for receiving information, and the UE transmits at least one of MID of the UE, security value, security credential, PLMN ID, network type, and UE location information (loc.) selectively as the important information.

At least one of the parameters including PLMN ID, network type, and location information may be transmitted selectively by means of the PC 186 at steps 801-1, 801-2, 801-3, and 801-4 (hereinafter, referred to integrally as 801-*x*). Also, the information can be input by means of the PC 186 with other identifier than MID at step 801-*x*, step 801-*x* for inputting information by means of the PC may be replaced by the method of allocating unique number or identifier, i.e. device ID, for easy access of the user or the device purchaser and using a PIN number for authenticating the device.

In an embodiment, instead of transmitting the information provision request message at step 801, it is possible to send the USIM central center 180 the information provision request message via the USIM central center admission control server (USIM central center Adm server) 180-2 through three split steps of 801-2, 801-3, and 801-4. However, there is a method for the USIM central center Adm server 180-2 to verify the valid UE. This is an embodiment of the method of receiving only the initial provisioning request and verifying the request made with valid right assigned by the manufacturer such as valid MID to allow for access to the USIM central center 180, without accepting the direct connection to the USIM central center 180 to protect the USIM central center adm server 180-2 from the Distribute Denial of Service Attach (DDoS) as a hacking attack to a specific site by controlling a plurality of computers to operate simultaneously.

The information provision request message includes at least one of Mobile Identity (MID), security value, security credential, Public Land Mobile Network identity (PLMN) ID, and network type.

The MID is the identifier for use in identifying the corresponding UE 110 or USIM/SIM/UICC 170 at the USIM central center 180. The MID is assigned by the manufacturer (vendor) of the UE 110, i.e. USIM/SIM/UICC 170, and used by the USIM central center 180 to identify the UE 110. The USIM/SIM/UICC is provided in the form of a module or card containing the subscriber authentication information capable of identifying the subscriber.

The information provision request message may include security informations as well as the MID. The representative security informations are security value and security credential.

The security value is used when a message is received in response to the information provision request message. The UE 110 compares the security value it has transmitted and the received message. Through the comparison, it is possible to test whether the received message is the malicious message sent by an attacker or an invalid node. That is, the security value is sued to verify the message transmitted in response to the request in has transmitted. Various values capable of authenticating the UE such as security algorithm value supported by the UE like security capability or random number generated by the UE 110 can be used as the security value.

Typically, the security credential is composed of a pair of public key and secret key and a certificate in the public key infrastructure (PKI) security method. In the present invention, however, the security credential is a general expression on the information capable of being used for verification of the valid terminal used in the USIM authentication center 190 as well as such information.

If the PKI method is used, the USIM authentication center 190 may use the security credential to authenticate the UE 110 or USIM 170 which has transmitted the authentication value as a method used in general. It may be used to authenticate peer nodes transmitted the value though the Authentication and Key Agreement protocol (AKA) mutually. In this case, the vector value used in AKA may be the security credential. In the case of using the authentication method with random number and key value, the random value may be sued as the security credential. Other various candidate technologies may be used. In the following embodiment, if there is any security information which the USIM authentication center 190 can use to verify the valid user, this can be referred to as security credential.

The PLMN ID is also referred to as serving network ID. In order for the subscriber to provide the country information of the operator network for subscription and operator network information to the USIM center 191, the UE 110 may send the information on the network providing the service using the PLMN ID. The network type is the information on the type of the network providing the service. The network type may be the information on the type of the network of the wired/wireless links of the operator network such as Evolved Packet System (EPS) network as Evolved UMTS Terrestrial Radio Access Network (EUTRAN), UMTS Terrestrial Radio Access Network (UTRAN), and GSM/EDGE Radio Access Network (GERAN). If the network type is included in the information provision request message, the UE 110 may use one of various network types provided by the corresponding operator selectively. That is, the UE 110 may select the wired/wireless link for use in receiving the service. The location information of the UE 110 can be used to determine the MME 114 or MSC 188 providing the user with the service or determining the tracking area providing the user with the service.

The USIM central center 180 sends the USIM authentication center 190 the information provision verification request message at step 811. This message may include at least one of the MID, security credential, PLMN ID, and network type. In this way, the USIM central center 180 requests for verifying whether the corresponding MID is of a valid user accessible to the operator network using the identity and the security credential. Various security credentials can be sued for verification on the information provision request.

If the USIM authentication center 190 and the UE 110 use the PKI system, the public key and security key of PKI are used as security credentials. That is, the USIM Authentication Center 190 verifies the UE 110 or USIM 170 which has transmitted the authentication value with the public and security keys. It may be used to authenticate peer nodes transmitted the value though the Authentication and Key Agreement protocol (AKA) mutually. In this case, the vector value used in AKA may be the security credential. In the case of using the authentication method with random number and key value, the random value may be used as the security credential. Other various candidate technologies may be used. In this embodiment, if there is any security information which the USIM authentication center 190 can use to verify the valid user, this can be referred to as security credential. A detailed procedure of using the security credential is not mentioned. However, the USIM Central Center 180 sends the USIM Authentication Center 190 the information provision verification request message and receives the information provision verification response message in replay at steps 811 and 813 as the corresponding procedure. In this case, the security parameter called security credential used at steps 811 and 813 may be determined depending on whether to use PKI or AKA scheme. In any case, however, it is possible to verify the valid access of the UE 110 based on the information provided by the UE 110 such as security parameter and identity called as security credential at steps 811 and 813. This verification procedure can be modified in various ways by those skilled in the art. The USIM Authentication center 190 sends the USIM Central Center the information provision authentication response message at step 813. The information provision authentication response message may include MID to indicate corresponding information provision authentication request verified successfully. The process of steps 813-2 to 813-16 are performed selectively.

If the USIM authentication center 190 sends the USIM central center 180 a response message in reply to the information provision verification request at step 813, the USIM central center 180 sends the MME-VNO 115 the information provision response message including MID at step 813-2. The MME-VNO 115 of the visited network sends the MSC-VNO 188-2 a location registration request message at step 813 after the verification process. This message includes the MID and/or MME identifier. Afterward, the MSC 188-2 stores the mapping between the MID and the MME identifier at step 813-12, and the MSC-VNO 188-2 sends the HSS-VNO 121-2 the MID and MSC address (MSCA) at step 813-13. The HSS-VNO 121-2 stores the mapping the MID and the MSCA at step 813-14 and generates MSISDN at step 813-15. Here, the generated MSISDN is used for transmitting the initial information as the identifier for use in the communication through CS network. The MID, MSISDN, and MSCA are transmitted to the MSC-VNO 188-2 at step 813-16.

Afterward, the USIM central center 180 sends the USIM center 191 at least one of the MID, security value, PLMN ID, network type, security central center verification value (hereinafter, Sec-Central center) for use in verifying the USIM central center at the USIM center for mutual authentication and security between the USIM central center 180 and the USIM center 191, and UE location information (loc.). The Sec-central center verification value may be a value including the public key/secret key in verification using the PKI system, a random number ciphered and deciphered with a shared key in using the mutual authentication method, and an authentication token value in using the AKA method, and the detailed procedure of the mutual authentication is omitted herein. Upon receipt of the parameter, the USIM center 191 verifies the Sec-central center verification value at step 817. The USIM center 191 generates the security key in an embodiment (case 1) where the USIM center is responsible for generating and distributing the security key. In another embodiment (case 2) where the USIM center has not security key generation function, the Authentication Center (AUC) may be responsible for the corresponding function. That is, the AUC/HSS/HLR 121 is responsible for security key generation function such that the security key can be sued as the master key (root key) assigned to the corresponding operator in itself. In still another embodiment (case 3), the USIM center generates the security key which is used as a seed for generating the security master key which is security-reinforced per operator. That is, the derived master key (Kdm) working as the master key in the operator network is derived from the security key generated at the USIM center at the AUC/HSS/HLR 121 of the operator network. The master key may be the root key or derived master key (Kdm) from which the authentication key (KASME) for use in the operator network is derived afterward, the authentication key being used to generate NAS integrity key (KNASint) NAS encryption key (KNASenc).

The USIM center 191 determines the MME to which the UE has connected or the MSC connected to the MME to which the UE has connected or another MME or MSC to provide the UE with the initial information provision service using the PLMN ID, UE location information, and information on the network to which the UE has connected, at step 819-2. Although this embodiment exemplifies the case where the MME to which the UE has connected and the MSC connected to the corresponding MME provides the UE with the initial information provision service, this can be modified in various ways. That is, such selection method can be modified in various ways depending on whether the UE receives the service from the connected operator network or other operator network. Afterward, the USIM center 191 may determine the tracking area identity list (TA ID list) for the MME to select an eNB for providing the initial information provision service at step 819-3, and this information is transmitted at step 837 or 839. The MME may be selected by the USIM center 191 or the central OTA server 182-2 and description thereon is made with reference to steps 837-2 and 837-3.

In an embodiment (case 1), the USIM center generates and stores the security key at step 819 and transmits the MID as the identifier of the UE or USIM/UICC/SIM, security value, PLMN ID, and network type to the MME 114 of the operator network to which the UE intends to subscribe at step 821. Afterward, the MME 114 sends the HSS/HLR 121 the MID, the security value and, if the USIM center has generated the security key, the security key at step 823. The AUC/HSS/HLR 121 generates and stores the IMSI as the UE identifier and, if the USIM center 191 has not generated the security key, the security key according to another embodiment (case 2) at step 825. At step 825, the AUC/HSS/HLR 121 also may generate and store Mobile Station International Integrated Service Digital Network Number (MSISDN) necessary for communication in the CS network. If the network to which the UE has connected initially differs from the network which is to provide the UE with the service are different operator networks, the MSISDN generated at step 813-15 is used for transmitting information on the information provisioning to the UE while the MSISDN assigned at step 825 is the identifier of the UE for use in a new network, i.e. the two MSISDNs are different in nature from each other. In another embodiment, although the two networks are different operator networks, the MSISDN for use in transmitting information on the information transmission and the MSISDN to be used in the network afterward may be identical with each other.

Unlike the above example (case 1), the AUC/HSS/HLR 121 generates the security in another embodiment (case 2). In still another embodiment (case 3), a master key (derived master key) is generated using the security key sent by the USIM center 191 as a seed, the derived master key (Kdm) being used as the security master key. In the case 1, the security key transmitted stored at steps 827, 829, and 836 is the security key generated by the USIM center 191. In the case 2, the security key transmitted and stored at steps 827, 829, and 836 is the key generated by the AUC/HSS/HLR 121. In the case 3, the security key transmitted and stored at steps 827, 829, and 836 is the security master key derived using the key received from the USIM center 191 as the seed. The AUC/HSS/HLR 121 sends the MME 114 the MID at step 827. Depending on the embodiment, the AUC/HSS/HLR 121 may further send the MME 114 the IMSI, security key (case 2)/security master key (case 3), and profile information. The profile is the information necessary for configuring the UE 110 or USIM/UICC/SIM to be fit for the corresponding operator network. The profile may include at least one milenage algorithm representing the security function in AKA, SNOW (stream cipher: a new word stream cipher) cipher/integrity security algorithm, Advanced Encryption Standard ciphering/integrity protection security algorithm. The profile also may include at least one of access control class, emergency call codes, PLMN list, and home network domain.

The MME 114 sends the USIM center 191 the MID, IMSI, and security key (case 2)/security master key (case 3), profile information, and security value at step 629.

The USIM center 191 sends the USIM central center 180 the MID and security USIM center verification value (Sec-USIM center) used for verifying the USIM center at the USIM central center to mutual authentication and security between the USIM central center 180 and the USIM center 191. This is the step of notifying that the USIM center has processed the USIM central center's request for processing request for the UE having the MID successfully. The Sec-central center verification value may be a value including the public key/secret key in verification using the PKI system, a random number ciphered and deciphered with a shared key in using the mutual authentication method, and an authentication token value in using the AKA method, and the detailed procedure of the mutual authentication is omitted herein. Upon receipt of the parameters, the USIM central center 1809 verifies the Sec-USIM center value. the USIM central center 180 sends the USIM center 191 the confirm message at step 835, and this is the message notifying that the USIM center has processed the request of the USIM central center for the UE having the MID successfully. In case 2 or 3, since the security key or security master key value is generated or modified at the AUC/HSS/HLR 121 at step 836, the USIM center 191 may store the security key/security master key value. If the USIM center 191 is responsible for storing the security information allocated by the operator in association with MID, the USIM center 191 may store the MID, security value, IMSI, security key/security master key, and profile. Meanwhile, the USIM center 191 may send the MME 114 a confirm message at step 836-2, and the MME 1140 stores the MID for verifying and controlling, when there is connection request for the corresponding UE, the access of the UE before checking to the HSS, the stored information is used for the MME 1140 to verify the MID to block the access of the invalid UE 110 before transmitting the connection request of the UE 110 to the HSS for IMSI verification as at step 852.

Afterward, the USIM center 191 sends the central OTA server 182-2 the MID, security value, IMSI, security key/security master key, profile, and (when the TA ID list information is determined at step 819-3) the TA ID list at step 837.

If the USIM center 191 has not selected any MME for providing initial information at steps 819-2 and 819-3 or if the central OTA server is capable of selecting MME, the central OTA server may select an MME at step 837-2 and 837-3. That is, the central OTA server 182-2 may select the MME to which the UE has connected or the MSC connected to the MME to which the UE has connected using at least one of PLMN ID, UE location information and UE-connected network information at step 837-2. Although this embodiment exemplifies the case where MME to which the UE has connected and the MSC connected to the MME to which the UE has connected relays the initial information provision service to the UE, this procedure may be modified in various ways. That is, the selection method may be modified in various ways depending on whether the UE is served by the connected network operator or another operator. The central OTA server 182-2 may determine the information such as tracking area identity list (TA ID list) at step 837-3, and this information is transmitted at step 839 and subsequent steps. The central OTA server 182-2 sends the Short Message Service Center (SMSC) 184-2 the MID, security value, IMSI, security key/security master key, profile, and, if necessary, TA ID list at step 839. The SMSC 184 sends the UE 110 the MID, security value, IMSI, security key/security master key, profile, and TA ID list at steps 839-2 to 841-2. The process of steps 839-2 to 841-2 is performed in such a way that the SMSC 184-2 transmits to the MSC 188-2 the informations and parameters (such as MID, security value, IMSI, security key, and profile) and, if the network providing the UE with the service is a Circuit Switched (CS) data service network, the MSC 188-2 delivers the informations and parameters to the UE 110 or, if the network providing the UE with the service is a Packet Switched (PS) data service network, the MSC 188-2 forwards the informations and parameters to MME 115 such that the MME 115 delivers the informations and parameters to the UE 110.

A detailed description is made of such a procedure hereinafter.

Steps 839-2 to 839-5 may be performed selectively.

The SMSC 184-2 sends the GMSC 187-2 at least one of MID, security value, IMSI, security key/security master key, profile, and TA ID list at step 639-2. Afterward, the GMSC 187-2 requests the HSS 121-2 for the MSC address (MSCA) with MSISDN at step 839-3 and receives the MSCA at step 839-4. Afterward, if the MSC is found based on the MSCA at step 839-4, the GSMC 187-2 sends the MSC 188-2 the MID, security value, IMSI, security key/security master key, profile, and TA ID list. Afterward, the MSC 188-2 sends the MME 115 the MID, security value, IMSI, security key/security master key, profile, and TA ID list.

The MME 115 determines an eNB to which it forwards the received information using the TA ID list or by taking notice of the eNB 113 and MME 115 to which the UE has connected as in an embodiment of the present invention at step 839-7 and sends the eNB 113 the MID and security value at step 841-1, and the eNB delivers the information to the UE 110 at step 841-2.

The UE 110 verifies the validity of the received information, i.e. whether the information is received in response to the request it has transmitted, using the MID and security value at step 843.

The process of steps 843-2 and 843-3 may be performed optionally.

The UE 110 notifies the eNB 113 that the security value has been verified successfully at step 843-2, and the eNB 112 notifies the MME 115 that the UE 112 has verified the security value successfully at step 843-3. Afterward, the MME 114 sends the eNB 112 the MID, security value, IMSI, security key/security master key, profile, TA ID list, and MSISDN at step 843-5. The eNB 112 sends the UE 110 at least one of MID, security value, IMSI, security key/security master key, profile, TA ID list, and MSISDN at step 843-6, in a way similar to paging.

Upon receipt of the information, the UE 110 stores at least one of MID, security value, IMSI, security key/security master key, profile, TA ID list, and MSISDN at step 845. The USIM 170 triggers the ME 111 to perform ATTACH procedure of the UE at step 847. The UE 110 sends the MME 114 the ATTACH message including IMSI as the UE identifier via the eNB 112 at steps 849 and 851. The MME 114 sends the UE 110 an ATTACH ACCEPT message via the eNB 112 at steps 859 and 861. Since the ATTACH procedure is well known, the description is directed to a part modified in the present invention herein.

Figure 12A:
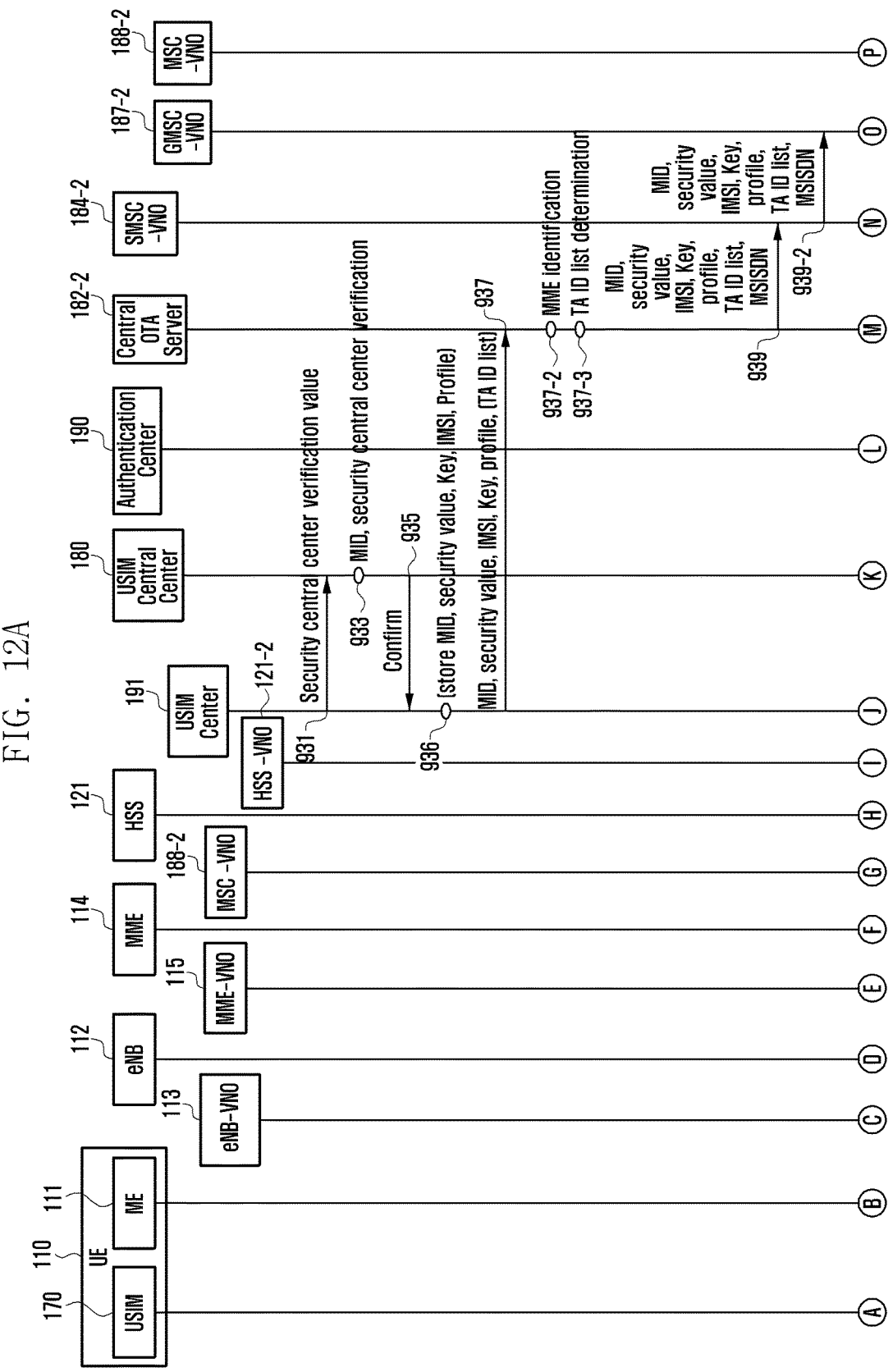
Figure 12B:
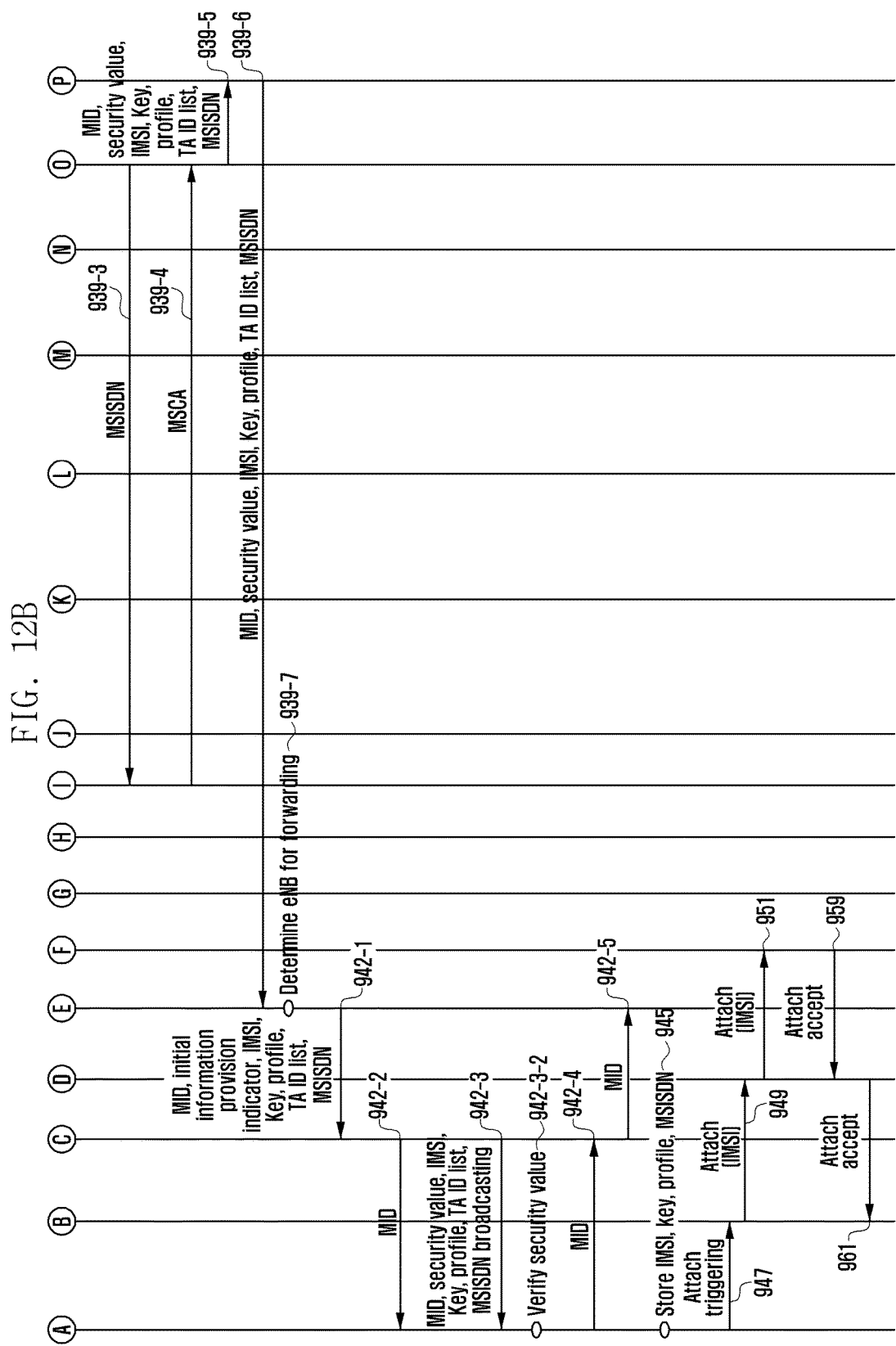

FIGS. 12a and 12b are a flow diagram illustrating the information provisioning procedure according to an embodiment of the present invention.

Since the first part of the procedure of FIGS. 12a and 12b is identical with or similar to the corresponding part of FIGS. 10a to 11b, the description is directed to a different part of steps 939-7 to 942-6.

The MME 115 selects an eNB to which it forwards the received information using the TA ID list or by taking notice of the eNB and MME to which the UE has connected at step 937-7.

The MME-VNO 115 sends the eNB-VNO 113 the MID, initial provisioning information transmission indicator, security value, IMSI, security key/security master key, profile, TA ID list, and MSISDN at step 942-1. The indicator of step 942-1 may be used as a parameter indicating transmission of the initial provisioning information, and the procedure may be modified depending on whether the MME-VNO 115 sends the initial provision information indication message to the eNBs connected to the MME or a specific eNB based on the TA list.

The eNB-VNO 113 pages the UE 110 in the idle mode to receive the initial provisioning message at step 942-2. The eNB-VNO 113 transmits the MID, security value, IMSI, security key/security master key, profile, and MSISDN to the UE 110 in the system information message broadcast at step 942-3. The UE 110 verifies the validity of the received information, i.e. whether the information is received in response to the request it has transmitted using the security value at step 942-3-2.

The process of steps 942-4 and 942-5 is performed selectively.

The UE 110 notifies the eNB-VNO 113 of the successful security value verification at step 942-4, and the eNB-VNO 113 notifies the MME 115 that the UE 110 has verified the security value successfully at step 942-5.

The effects achieved by the representative part of the disclosed invention operating as described above are as follows.

The present invention relates to the method and system for provisioning the UE identifier and security parameters using Non-Access Stratum (NAS) and other protocols in EUTRAN or other RAT (GERAN, UTRAN, etc.) environment in such a way that the UE selects an operator and communicates the security and other informations in the mobile communication network, configuring, at the UE, the operation using the protocol according to the present invention, allocating the related identifier and security-related parameters for communication with the corresponding operator so as to facilitate UE authentication, security mode commend execution, and communication, resulting in improvement of security management efficiency.

Although the description has been made with reference to particular embodiments, the present invention can be implemented with various modifications without departing from the scope of the present invention. Thus, the present invention is not limited to the particular embodiments disclosed but will include the following claims and their equivalents.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for configuring a terminal by the terminal, the method comprising:
    selecting, via an interface in the terminal, an operator of a network to subscribe and a network type for use in connection of the terminal with the network to subscribe;
    when the terminal is in connection with a visited network, transmitting, to a base station in the visited network, an information provision request message for the operator of the network to subscribe and the network type, wherein the information provision request message includes a public land mobile network identity (PLMN ID) for the operator of the network to subscribe, the network type, location information of the terminal, a security value, and a security credential;
    receiving, from the base station in the visited network, information for use in the connection of the terminal with the network, wherein the information is in response to the information provision request message and the information includes a security key and an identifier generated by a home subscriber server (HSS) in the network to subscribe; and
    transmitting, to a base station in the network to subscribe, an attach message using the security key and the identifier included in the information,
    wherein the location information included in the information provision request message is used to determine a mobility management entity (MME), a mobile switching center (MSC), or a tracking area which provides service to a user equipment (UE),
    wherein the security value included in the information provision request message is used to verify a validity of the information, and
    wherein the security credential included in the information provision request message is used to verify a validity of the terminal in a universal subscriber identity module (USIM) authentication center.

2. The method of claim 1, wherein the information provision request message further comprises a mobile identity (MID) of the terminal.

3. The method of claim 2, wherein the MID of the terminal comprises at least one of an international mobile station identifier (IMSI) or a mobile subscriber integrated service digital network (MSISDN).

4. The method of claim 1, wherein the security key comprises at least one of a root key or a derived root key.

5. A method for configuring a terminal by an information provision entity, the method comprising:
    when the terminal is in connection with a visited network, receiving, from a mobility management entity (MME) in the visited network, an information provision request message for an operator of a network to subscribe and a network type selected by the terminal, wherein the information provision request message includes a public land mobile network identity (PLMN ID) for the operator of the network to subscribe, the network type, location information of the terminal, a security value, and a security credential;
    generating information for use in connection of the terminal with the network to subscribe, the information including a security key and an identifier; and
    transmitting, to an MME in the network to subscribe, the information including the security key and the identifier being used to perform secure communication between the terminal and the network in response to the information provision request message,
    wherein the operator of the network to subscribe and the network type for use in connection of the terminal with the network to subscribe are selected via an interface in the terminal,
    wherein the location information included in the information provision request message is used to determine a mobility management entity (MME), a mobile switching center (MSC), or a tracking area which provides service to a user equipment (UE),
    wherein the security value included in the information provision request message is used to verify a validity of the information, and
    wherein the security credential included in the information provision request message is used to verify a validity of the terminal in a universal subscriber identity module (USIM) authentication center.

6. The method of claim 5, wherein the information provision request message further comprises a mobile identity (MID) of the terminal.

7. The method of claim 6, wherein the MID of the terminal comprises at least one of an international mobile station identifier (IMSI) or a mobile subscriber integrated service digital network (MSISDN).

8. The method of claim 5, wherein the information provision entity is implemented in at least one of a USIM central center or a home subscriber server (HSS).

9. The method of claim 5, wherein the security key comprises at least one of a root key or a derived root key.

10. A terminal, comprising:
    a transceiver; and
    a controller coupled with the transceiver and configured to control to:
    select, via an interface in the terminal, an operator of a network to subscribe and a network type for use in connection of the terminal with the network to subscribe,
    when the terminal is in connection with a visited network, transmit, to a base station in the visited network, an information provision request message for the operator of the network to subscribe and the network type, wherein the information provision request message includes a public land mobile network identity (PLMN ID) for the operator of the network to subscribe, the network type, and location information of the terminal, a security value, and a security credential,
    receive, from the base station in the visited network, information for use in the connection of the terminal with the network, wherein the information is in response to the information provision request message and the information includes a security key and an identifier generated by a home subscriber server (HSS) in the network to subscribe, and
    connect to the network entity using the security key and the identifier included in the information, wherein the location information included in the information provision request message is used to determine a mobility management entity (MME), a mobile switching center (MSC), or a tracking area which provides service to a user equipment (UE), wherein the security value included in the information provision request message is used to verify a validity of the information, and wherein the security credential included in the information provision request message is used to verify a validity of the terminal in a universal subscriber identity module (USIM) authentication center.

11. The terminal of claim 10, wherein the information provision request message further comprises a mobile identity (MID) of the terminal.

12. The terminal of claim 11, wherein the MID of the terminal comprises at least one of an international mobile station identifier (IMSI) or a mobile subscriber integrated service digital network (MSISDN), and wherein the security key comprises at least one of a root key or a derived root key.

13. An information provision entity, comprising:

a transceiver; and a controller coupled with the transceiver and configured to control to:

when a terminal is in connection with a visited network, receive, from a mobility management entity (MME) in the visited network, an information request message for an operator of a network to subscribe and a network type selected by the terminal, wherein the information provision request message includes a public land mobile network identity (PLMN ID) for the operator of the network to subscribe, the network type, location information of the terminal, a security value, and a security credential, generate information for use in connection of the terminal with the network to subscribe, the information including a security key and an identifier, and transmit, to an MME in the network to subscribe, the information including the security key and the identifier being used to perform secure communication between the terminal and the network in response to the information provision request message, wherein the operator of the network to subscribe and the network type for use in connection of the terminal with the network to subscribe are selected via an interface in the terminal, wherein the location information included in the information provision request message is used to determine a mobility management entity (MME), a mobile switching center (MSC), or a tracking area which provides service to a user equipment (UE), wherein the security value included in the information provision request message is used to verify a validity of the information, and wherein the security credential included in the information provision request message is used to verify a validity of the terminal in a universal subscriber identity module (USIM) authentication center.

14. The information provision entity of claim 13, wherein the information provision request message further comprises a mobile identity (MID) of the terminal, and wherein the information provision entity is implemented in at least one of a universal subscriber identity module (USIM) central center or a home subscriber server (HSS).

15. The information provision entity of claim 14, wherein the MID of the terminal comprises at least one of an international mobile station identifier (IMSI) or a mobile subscriber integrated service digital network (MSISDN), and wherein the security key comprises at least one of a root key or a derived root key.

* * * * *